US010133663B2

(12) United States Patent
Atkisson et al.

(10) Patent No.: US 10,133,663 B2
(45) Date of Patent: Nov. 20, 2018

(54) SYSTEMS AND METHODS FOR PERSISTENT ADDRESS SPACE MANAGEMENT

(71) Applicant: Longitude Enterprise Flash S.A.R.L., Luxembourt OT (LU)

(72) Inventors: David Atkisson, Draper, UT (US); David Nellans, Salt Lake City, UT (US); David Flynn, Sandy, UT (US); Jens Axboe, Kolding (DK); Michael Zappe, Arvada, CO (US)

(73) Assignee: Longitude Enterprise Flash S.A.R.L., Luxembourg (LU)

( * ) Notice: Subject to any disclaimer, the term of this patent is extended or adjusted under 35 U.S.C. 154(b) by 163 days.

(21) Appl. No.: 14/045,605

(22) Filed: Oct. 3, 2013

(65) Prior Publication Data

US 2015/0012689 A1 Jan. 8, 2015

Related U.S. Application Data

(63) Continuation of application No. 13/330,554, filed on Dec. 19, 2011, now abandoned.
(Continued)

(51) Int. Cl.
G06F 12/02 (2006.01)
(52) U.S. Cl.
CPC ...... *G06F 12/0246* (2013.01); *G06F 12/0292* (2013.01); *G06F 2212/7205* (2013.01);
(Continued)
(58) Field of Classification Search
CPC .......................... G06F 12/0246; G06F 12/0292
See application file for complete search history.

(56) References Cited

U.S. PATENT DOCUMENTS

| 4,571,674 A | 2/1986 | Hartung |
| 5,042,871 A | 8/1991 | Nishigaki et al. |

(Continued)

FOREIGN PATENT DOCUMENTS

| CN | 1632765 A | 6/2005 |
| CN | 1771495 | 5/2006 |

(Continued)

OTHER PUBLICATIONS

WIPO, International Preliminary Report of Patentability for PCT/US2007/086691, dated Feb. 16, 2009.
(Continued)

*Primary Examiner* — Charles Rones
*Assistant Examiner* — Tian-Pong Chang

(57) ABSTRACT

Data is stored on a non-volatile storage media in a sequential, log-based format. The formatted data defines an ordered sequence of storage operations performed on the non-volatile storage media. A storage layer maintains volatile metadata, which may include a forward index associating logical identifiers with respective physical storage units on the non-volatile storage media. The volatile metadata may be reconstructed from the ordered sequence of storage operations. Persistent notes may be used to maintain consistency between the volatile metadata and the contents of the non-volatile storage media. Persistent notes may identify data that does not need to be retained on the non-volatile storage media and/or is no longer valid.

19 Claims, 15 Drawing Sheets

Related U.S. Application Data

(60) Provisional application No. 61/424,585, filed on Dec. 17, 2010, provisional application No. 61/425,167, filed on Dec. 20, 2010.

(52) U.S. Cl.
CPC ............. *G06F 2212/7207* (2013.01); *G06F 2213/0038* (2013.01)

(56) References Cited

U.S. PATENT DOCUMENTS

| | | |
|---|---|---|
| 5,124,987 A | 6/1992 | Milligan et al. |
| 5,193,184 A | 3/1993 | Belsan et al. |
| 5,261,068 A | 11/1993 | Gaskins et al. |
| 5,263,003 A | 11/1993 | Cowles et al. |
| 5,307,497 A | 4/1994 | Feigenbaum et al. |
| 5,325,509 A | 6/1994 | Lautzenheiser |
| 5,337,275 A | 8/1994 | Garner |
| 5,392,427 A | 2/1995 | Barrett et al. |
| 5,404,485 A | 4/1995 | Ban |
| 5,422,856 A | 6/1995 | Sasaki et al. |
| 5,434,994 A | 7/1995 | Shaheen et al. |
| 5,438,671 A | 8/1995 | Miles |
| 5,469,555 A | 11/1995 | Ghosh et al. |
| 5,485,595 A | 1/1996 | Assar et al. |
| 5,499,354 A | 3/1996 | Aschoff et al. |
| 5,504,882 A | 4/1996 | Chai |
| 5,535,328 A | 7/1996 | Harari et al. |
| 5,535,399 A | 7/1996 | Blitz et al. |
| 5,553,261 A | 9/1996 | Hasbun et al. |
| 5,586,291 A | 12/1996 | Lasker et al. |
| 5,594,883 A | 1/1997 | Pricer |
| 5,596,736 A | 1/1997 | Kerns |
| 5,598,370 A | 1/1997 | Niijima et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,802,602 A | 9/1998 | Rahman et al. |
| 5,809,515 A | 9/1998 | Kaki et al. |
| 5,809,527 A | 9/1998 | Cooper et al. |
| 5,809,543 A | 9/1998 | Byers et al. |
| 5,845,329 A | 12/1998 | Onishi et al. |
| 5,930,815 A | 7/1999 | Estakhri et al. |
| 5,933,847 A | 8/1999 | Ogawa |
| 5,953,737 A | 9/1999 | Estakhri et al. |
| 5,957,158 A | 9/1999 | Volz et al. |
| 5,960,462 A | 9/1999 | Solomon et al. |
| 6,000,019 A | 12/1999 | Dykstal et al. |
| 6,014,747 A | 1/2000 | Jennett |
| 6,034,897 A | 3/2000 | Estakhri et al. |
| 6,069,827 A | 5/2000 | Sinclair |
| 6,073,232 A | 6/2000 | Kroeker et al. |
| 6,101,601 A | 8/2000 | Matthews et al. |
| 6,170,039 B1 | 1/2001 | Kishida |
| 6,170,047 B1 | 1/2001 | Dye |
| 6,173,381 B1 | 1/2001 | Dye |
| 6,185,654 B1 | 2/2001 | Van Doren |
| 6,209,003 B1 | 3/2001 | Mattis et al. |
| 6,209,088 B1 | 3/2001 | Reneris |
| 6,236,593 B1 | 5/2001 | Hong et al. |
| 6,256,642 B1 | 7/2001 | Krueger et al. |
| 6,279,069 B1 | 8/2001 | Robinson et al. |
| 6,289,413 B1 | 9/2001 | Rogers et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,911 B1 | 1/2003 | Langford |
| 6,513,112 B1 * | 1/2003 | Craig ................ G06F 8/71 713/1 |
| 6,523,102 B1 | 2/2003 | Dye et al. |
| 6,564,285 B1 | 5/2003 | Mills et al. |
| 6,587,915 B1 | 7/2003 | Kim |
| 6,601,211 B1 | 7/2003 | Norman |
| 6,611,836 B2 | 8/2003 | Davis et al. |
| 6,622,200 B1 | 9/2003 | Hasbun et al. |
| 6,625,685 B1 | 9/2003 | Cho et al. |
| 6,658,438 B1 | 12/2003 | Moore et al. |
| 6,671,757 B1 | 12/2003 | Multer et al. |
| 6,715,027 B2 | 3/2004 | Kim et al. |
| 6,725,321 B1 | 4/2004 | Sinclair et al. |
| 6,751,155 B2 | 6/2004 | Gorobets |
| 6,754,774 B2 | 6/2004 | Gruner et al. |
| 6,763,440 B1 | 7/2004 | Traversat et al. |
| 6,775,185 B2 | 8/2004 | Fujisawa et al. |
| 6,779,088 B1 | 8/2004 | Benveniste et al. |
| 6,785,776 B2 | 8/2004 | Arimilli et al. |
| 6,785,785 B2 | 8/2004 | Piccirillo et al. |
| 6,865,657 B1 | 3/2005 | Traversat et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,901,499 B2 | 5/2005 | Aasheim et al. |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,973,531 B1 | 12/2005 | Chang et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,013,376 B2 | 3/2006 | Hooper, III |
| 7,013,379 B1 | 3/2006 | Testardi |
| 7,035,974 B2 | 4/2006 | Shang |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,076,599 B2 | 7/2006 | Aasheim et al. |
| 7,082,495 B2 | 7/2006 | DeWhitt et al. |
| 7,082,512 B2 | 7/2006 | Aasheim et al. |
| 7,010,662 B2 | 8/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,130,956 B2 | 10/2006 | Rao |
| 7,130,957 B2 | 10/2006 | Rao |
| 7,167,953 B2 | 1/2007 | Megiddo et al. |
| 7,171,536 B2 | 1/2007 | Chang et al. |
| 7,173,852 B2 | 2/2007 | Gorobets et al. |
| 7,181,572 B2 | 2/2007 | Walmsley |
| 7,194,577 B2 | 3/2007 | Johnson et al. |
| 7,194,740 B1 | 3/2007 | Frank et al. |
| 7,203,815 B2 | 4/2007 | Haswell |
| 7,215,580 B2 | 5/2007 | Gorobets |
| 7,219,238 B2 | 5/2007 | Saito et al. |
| 7,243,203 B2 | 7/2007 | Scheuerlein |
| 7,246,179 B2 | 7/2007 | Camara et al. |
| 7,254,686 B2 | 8/2007 | Islam |
| 7,260,820 B1 | 8/2007 | Waldspurger et al. |
| 7,275,135 B2 | 9/2007 | Coulson |
| 7,280,536 B2 | 10/2007 | Testardi |
| 7,293,183 B2 | 11/2007 | Lee et al. |
| 7,328,307 B2 | 2/2008 | Hoogterp |
| 7,340,558 B2 | 3/2008 | Voth et al. |
| 7,353,324 B2 | 4/2008 | Tanaka |
| 7,356,651 B2 | 4/2008 | Liu et al. |
| 7,360,015 B2 | 4/2008 | Matthews et al. |
| 7,366,808 B2 | 4/2008 | Kano et al. |
| 7,366,825 B2 | 4/2008 | Williams et al. |
| 7,395,384 B2 | 7/2008 | Sinclair et al. |
| 7,398,348 B2 | 7/2008 | Moore et al. |

(56) References Cited

U.S. PATENT DOCUMENTS

| | | |
|---|---|---|
| 7,437,510 B2 | 10/2008 | Rosenbluth et al. |
| 7,444,460 B2 | 10/2008 | Nakanishi et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansal et al. |
| 7,516,267 B2 | 4/2009 | Coulson et al. |
| 7,526,614 B2 | 4/2009 | van Riel |
| 7,529,905 B2 | 5/2009 | Sinclair |
| 7,536,491 B2 | 5/2009 | Kano et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,620,769 B2 | 11/2009 | Lee et al. |
| 7,620,773 B2 | 11/2009 | Nicholson et al. |
| 7,631,162 B2 | 12/2009 | Gorobets |
| 7,640,390 B2 | 12/2009 | Iwamura et al. |
| 7,644,239 B2 | 1/2010 | Ergan et al. |
| 7,664,239 B2 | 1/2010 | Groff et al. |
| 7,660,911 B2 | 2/2010 | McDaniel |
| 7,660,941 B2 | 2/2010 | Lee et al. |
| 7,664,906 B2 | 2/2010 | Chung et al. |
| 7,669,019 B2 | 2/2010 | Fujibayashi et al. |
| 7,676,628 B1 | 3/2010 | Compton et al. |
| 7,702,873 B2 | 4/2010 | Griess et al. |
| 7,707,232 B2 | 4/2010 | Dussud |
| 7,721,059 B2 | 5/2010 | Mylly et al. |
| 7,725,628 B1 | 5/2010 | Phan et al. |
| 7,734,643 B1 | 6/2010 | Waterhouse et al. |
| 7,774,392 B2 | 8/2010 | Lin |
| 7,778,961 B2 | 8/2010 | Chang et al. |
| 7,831,783 B2 | 11/2010 | Pandit et al. |
| 7,840,839 B2 | 11/2010 | Scales et al. |
| 7,853,772 B2 | 12/2010 | Chang |
| 7,873,782 B2 | 1/2011 | Terry |
| 7,873,803 B2 | 1/2011 | Cheng |
| 7,877,539 B2 | 1/2011 | Sinclair et al. |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,803 B2 | 3/2011 | Stefanus et al. |
| 7,925,879 B2 | 4/2011 | Yasaki et al. |
| 7,934,072 B2 | 4/2011 | Hobbet et al. |
| 7,941,591 B2 | 5/2011 | Aviles |
| 7,970,806 B2 | 6/2011 | Park et al. |
| 7,970,919 B1 | 6/2011 | Duran |
| 7,984,230 B2 | 7/2011 | Nasu et al. |
| 8,028,120 B2 | 9/2011 | Mo et al. |
| 8,046,526 B2 | 10/2011 | Yeh |
| 8,055,820 B2 | 11/2011 | Sebire |
| 8,078,794 B2 | 12/2011 | Lee et al. |
| 8,112,574 B2 | 2/2012 | Lee et al. |
| 8,127,103 B2 | 2/2012 | Kano et al. |
| 8,135,900 B2 | 3/2012 | Kunimatsu et al. |
| 8,135,904 B2 | 3/2012 | Lasser et al. |
| 8,151,082 B2 | 4/2012 | Flynn et al. |
| 8,171,204 B2 | 5/2012 | Chow et al. |
| 8,214,583 B2 | 7/2012 | Sinclair et al. |
| 8,261,005 B2 | 9/2012 | Flynn et al. |
| 8,533,391 B2 | 9/2013 | Song et al. |
| 8,572,310 B2 | 10/2013 | Oh et al. |
| 8,694,722 B2 | 4/2014 | Gorobets et al. |
| 8,745,011 B2 | 6/2014 | Kishi |
| 8,762,658 B2 | 6/2014 | Flynn et al. |
| 8,838,875 B2 | 9/2014 | Park |
| 9,152,556 B2 | 10/2015 | Olbrich et al. |
| 9,286,198 B2 | 3/2016 | Bennett |
| 2001/0008007 A1 | 7/2001 | Halligan et al. |
| 2002/0069317 A1 | 6/2002 | Chow et al. |
| 2002/0069318 A1 | 6/2002 | Chow et al. |
| 2002/0103819 A1 | 8/2002 | Duvillier et al. |
| 2002/0161855 A1 | 10/2002 | Manczak et al. |
| 2002/0181134 A1 | 12/2002 | Bunker |
| 2003/0061296 A1 | 3/2003 | Craddock et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0163630 A1 | 8/2003 | Aasheim et al. |
| 2003/0198084 A1 | 10/2003 | Fujisawa et al. |
| 2004/0003002 A1 | 1/2004 | Adelmann |
| 2004/0093463 A1 | 5/2004 | Shank |
| 2004/0117586 A1 | 6/2004 | Estakhri et al. |
| 2004/0148360 A1 | 7/2004 | Mehra et al. |
| 2004/0186946 A1 | 9/2004 | Lee |
| 2004/0205177 A1 | 10/2004 | Levy et al. |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0120177 A1 | 6/2005 | Black |
| 2005/0141313 A1 | 6/2005 | Gorobets et al. |
| 2005/0144358 A1 | 6/2005 | Conley et al. |
| 2005/0177672 A1 | 8/2005 | Rao |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0240713 A1 | 10/2005 | Wu et al. |
| 2005/0246510 A1 | 11/2005 | Retnamma et al. |
| 2005/0257017 A1 | 11/2005 | Yagi |
| 2005/0273476 A1 | 12/2005 | Wertheimer et al. |
| 2006/0004955 A1 | 1/2006 | Ware et al. |
| 2006/0017963 A1* | 1/2006 | Sakuda ............ H04N 1/00278 358/1.15 |
| 2006/0020744 A1 | 1/2006 | Sinclair et al. |
| 2006/0020745 A1 | 1/2006 | Conley et al. |
| 2006/0026339 A1 | 2/2006 | Rostampour |
| 2006/0026385 A1 | 2/2006 | Dinechin et al. |
| 2006/0047920 A1 | 3/2006 | Moore et al. |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0117153 A1 | 6/2006 | Tran et al. |
| 2006/0129778 A1 | 6/2006 | Clark et al. |
| 2006/0136657 A1 | 6/2006 | Rudelic et al. |
| 2006/0136685 A1 | 6/2006 | Griv et al. |
| 2006/0143396 A1 | 6/2006 | Cabot |
| 2006/0149893 A1 | 7/2006 | Barfuss et al. |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0271740 A1 | 11/2006 | Mark et al. |
| 2007/0005928 A1 | 1/2007 | Trika et al. |
| 2007/0016699 A1 | 1/2007 | Minami |
| 2007/0016754 A1 | 1/2007 | Testardi |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050548 A1 | 3/2007 | Bali et al. |
| 2007/0050572 A1 | 3/2007 | Nakamura et al. |
| 2007/0061508 A1 | 3/2007 | Zweighaft |
| 2007/0067326 A1 | 3/2007 | Morris et al. |
| 2007/0088666 A1 | 4/2007 | Saito |
| 2007/0118676 A1 | 5/2007 | Kano et al. |
| 2007/0118713 A1 | 5/2007 | Guterman et al. |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0147356 A1 | 6/2007 | Malas et al. |
| 2007/0150891 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0233937 A1 | 10/2007 | Coulson et al. |
| 2007/0260608 A1 | 11/2007 | Hertzberg et al. |

(56) References Cited

U.S. PATENT DOCUMENTS

| | | |
|---|---|---|
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0274150 A1 | 11/2007 | Gorobets |
| 2007/0300008 A1 | 12/2007 | Rogers et al. |
| 2008/0010395 A1 | 1/2008 | Mylly et al. |
| 2008/0052377 A1 | 2/2008 | Light |
| 2008/0052477 A1 | 2/2008 | Lee et al. |
| 2008/0091876 A1 | 4/2008 | Fujibayashi et al. |
| 2008/0109090 A1 | 5/2008 | Esmaili et al. |
| 2008/0114962 A1 | 5/2008 | Holt |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0140737 A1 | 6/2008 | Garst et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0276040 A1 | 11/2008 | Moritoki |
| 2008/0307192 A1* | 12/2008 | Sinclair ............... G06F 12/0246 711/218 |
| 2009/0070526 A1 | 3/2009 | Tetrick et al. |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0125650 A1 | 5/2009 | Sebire |
| 2009/0125700 A1 | 5/2009 | Kisel |
| 2009/0150599 A1 | 6/2009 | Bennett |
| 2009/0150605 A1 | 6/2009 | Flynn et al. |
| 2009/0150641 A1* | 6/2009 | Flynn ..................... G06F 3/061 711/202 |
| 2009/0228637 A1 | 9/2009 | Moon |
| 2009/0248763 A1 | 10/2009 | Rajan et al. |
| 2009/0248922 A1 | 10/2009 | Hinohara et al. |
| 2009/0276588 A1 | 11/2009 | Murase |
| 2009/0276654 A1 | 11/2009 | Butterworth |
| 2009/0287887 A1 | 11/2009 | Matsuki et al. |
| 2009/0292861 A1 | 11/2009 | Kanevsky et al. |
| 2009/0294847 A1 | 11/2009 | Maruyama et al. |
| 2009/0300277 A1 | 12/2009 | Jeddeloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005228 A1 | 1/2010 | Fukutomi et al. |
| 2010/0011147 A1 | 1/2010 | Hummel et al. |
| 2010/0017441 A1 | 1/2010 | Todd |
| 2010/0017556 A1 | 1/2010 | Chin |
| 2010/0017568 A1 | 1/2010 | Wadhawan et al. |
| 2010/0023674 A1 | 1/2010 | Aviles |
| 2010/0023676 A1 | 1/2010 | Moon |
| 2010/0023682 A1 | 1/2010 | Lee et al. |
| 2010/0030946 A1 | 2/2010 | Kano et al. |
| 2010/0076936 A1 | 3/2010 | Rajan |
| 2010/0082922 A1 | 4/2010 | George et al. |
| 2010/0095059 A1 | 4/2010 | Kisley et al. |
| 2010/0169542 A1* | 7/2010 | Sinclair ............... G06F 12/0246 711/103 |
| 2010/0205231 A1 | 8/2010 | Cousins |
| 2010/0205335 A1 | 8/2010 | Phan et al. |
| 2010/0211737 A1* | 8/2010 | Flynn ..................... G06F 3/0616 711/114 |
| 2010/0217916 A1 | 8/2010 | Gao et al. |
| 2010/0269542 A1 | 8/2010 | Cousins |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0293348 A1* | 11/2010 | Ye ........................ G06F 3/0613 711/157 |
| 2011/0022819 A1 | 1/2011 | Post et al. |
| 2012/0331206 A1 | 12/2012 | Flynn et al. |
| 2014/0372679 A1 | 12/2014 | Flynn et al. |

FOREIGN PATENT DOCUMENTS

| | | |
|---|---|---|
| EP | 1418502 | 5/2004 |
| EP | 1814039 | 3/2009 |
| GB | 0123416 | 9/2001 |
| JP | 424848 | 8/1992 |
| JP | 8153014 | 6/1996 |
| JP | 200259525 | 9/2000 |
| JP | 2001296974 | 10/2001 |
| JP | 2009122850 | 6/2009 |
| WO | WO1994/019746 | 9/1994 |
| WO | WO1995/018407 | 7/1995 |
| WO | WO1996/12225 | 4/1996 |
| WO | WO2002/01365 | 1/2002 |
| WO | WO2004/099989 | 11/2004 |
| WO | WO2005/103878 | 11/2005 |
| WO | WO2006/062511 | 6/2006 |
| WO | WO2006/065626 | 6/2006 |
| WO | 2006113334 | 10/2006 |
| WO | WO2008/130799 | 3/2008 |
| WO | WO2008/073421 | 6/2008 |
| WO | WO2011/106394 | 9/2011 |

OTHER PUBLICATIONS

WIPO, International Preliminary Report on Patentability for PCT/US2007/086688, dated Mar. 16, 2009.
WIPO, International Preliminary Report on Patentability for PCT/US2007/086701, dated Mar. 16, 2009.
WIPO, International Preliminary Report on Patentability for PCT/US2007/086687, dated Mar. 18, 2009.
WIPO, International Preliminary Report on Patentability for PCT/US2007/025048, dated Jun. 10, 2009.
WIPO, International Preliminary Report on Patentability for PCT/US2007/059048, dated Oct. 20, 2009.
WIPO, International Preliminary Report on Patentability for PCT/US2010/048325, dated Mar. 13, 2012.
WIPO, International Search Report and Written Opinion for PCT/US2007/86691, dated May 8, 2008.
WIPO, International Search Report and Written Opinion for PCT/US2007/025048, dated May 27, 2008.
WIPO, International Search Report and Written Opinion for PCT/US2007/086701, dated Jun. 5, 2008.
WIPO, International Search Report and Written Opinion for PCT/US2007/059048, dated Aug. 25, 2008.
WIPO, International Search Report and Written Opinion for PCT/US2007/086687, dated Sep. 5, 2008.
WIPO, International Search Report and Written Opinion for PCT/US2010/048325, dated Jun. 13, 2011.
WIPO, International Search Report and Written Opinion for PCT/US2011/65927, dated Aug. 28, 2012.
WIPO, International Search Report and Written Opinion for PCT/US2012/029722, dated Oct. 30, 2012.
WIPO, International Search Report for PCT/US2011/025885, dated Sep. 28, 2011.
Wright, "Extending ACID Semantics to the File System", ACM Transactions on Storage, vol. 3, No. 2, published May 1, 2011, pp. 1-40.
Wu, "eNVy: A Non-Volatile, Main Memory Storage System," Acm 0-89791-660-3/94/0010, ASPLOS-VI Proceedings of the sixth international conference on Architectural support for programming languages and operating systems, pp. 86-97, 1994.

(56) References Cited

OTHER PUBLICATIONS

Yerrick, "Block Device," http://www.pineight.com/ds/block, last visited Mar. 1, 2010.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Agigatech, Bulletproof Memory for RAID Servers, Part 1, http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com No. IPCOM000042269D, 2005.
Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-27.
Arpaci-Dusseau, "Removing the Costs of Indirection in Flash-based SSDs with Nameless Writes," Jun. 2010, HotStorage'10, Boston, MA.
Asine, "ASPMC-660 Rugged IDE Flash Drive PMC Module," http://www.asinegroup.com/products/aspmc660.html, copyright 2002, visited Nov. 8, 2009.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
Bitmicro, "BiTMICRO Introduces E-Disk PMC Flash Disk Module at Military & aerospace Electronics East 2004," http://www.bitmicro.com/press.sub, published May 18, 2004, visited Mar. 8, 2011.
Bonnet, "Flash Device Support for Database Management," published Jan. 9, 2011.
Brandon, Jr., "Sparse Matrices in CS Education," Journal of Computing Sciences in Colleges, vol. 24 Issue 5, May 2009, pp. 93-98.
Clustered Storage Solutions: "Products," http://www.clusteredstorage.com/clustered_storage_solutions.HTML, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Dan, "Implementing MLC NAND Flash for Cost-Effective, High Capacity Memory," M-Systems, White Paper, 91-SR014-02-8L, Rev. 1.1, Sep. 2003.
EEEL-6892, Lecture 18, "Virtual Computers," Mar. 2010.
ELNEC, "NAND Flash Memories and Programming NAND Flash Memories Using ELNEC Device Programmers, Application Note," published Mar. 1, 2007.
European Patent Office, Office Action, EP Application No. 07865345.8, dated Nov. 17, 2010.
European Patent Office, Office Action, EP Application No. 07865345.8, dated Jan. 3, 2012.
Gal, "A Transactional Flash File System for Microcontrollers," 2005 USENIX Annual Technical Conference, published Apr. 10, 2009.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Gutmann, "Secure Deletion of Data from Magnetic and Solid-State Memory", Usenix, 14 pages, San Jose, CA, published Jul. 1, 1996.
Huffman, "Non-Volatile Memory Host Controller Interface," Apr. 14, 2008, 65 pgs.
Hynix Semiconductor, Intel Corporation, Micron Technology, Inc. Phison Electronics Corp., Sony Corporation, Spansion, Stmicroelectronics, "Open NAND Flash Interface Specification," Revision 2.0, Feb. 27, 2008.
Hystor: "Making SSDs the Survival of the Fittest in High-Performance Storage Systems," ics10-Paper 102, Feb. 2010.
IBM, "Method to Improve Reliability of SSD Arrays," Nov. 2009.
Intel, "Non-Volatile Memory Host Controller Interface (NVMHCI) 1.0," Apr. 14, 2008.
Johnson, "An Introduction to Block Device Drivers," Jan. 1, 1995.
Kawaguchi, "A Flash-Memory Based File System," TCON'95 Proceedings of the USENIX 1995 Technical Conference Proceedings, p. 13.
Mesnier, "Object-Based Storage," IEEE Communications Magazine, Aug. 2003, pp. 84-90.
Micron Technology, Inc., "NAND Flash 101: An Introduction to NAND Flash and How to Design It in to Your Next Product (TN-29-19)," http://www.micron.com/~/media/Documents/Products/Technical%20Note/NAND%20Flash/145tn2919_nand_101.pdf, 2006, visited May 10, 2010.
Micron, "TN-29-17: NAND Flash Design and Use Considerations," Mar. 10, 2010.
Micron, "TN-29-42: Wear-Leveling Techniques in NAND Flash Devices," Mar. 10, 2010.
Micron, TN-29-08: Technical Note, "Hamming Codes for NAND Flash Memory Devices," Mar. 10, 2010.
Microsoft, Data Set Management Commands Proposal for ATA8-ACS2, published Oct. 5, 2007, Rev. 3.
Microsoft, "How NTFS Works," Apr. 9, 2010.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Novell, "File System Primer", http://wiki.novell.com/index.php/File_System_Primer, 2006, visited Oct. 18, 2006.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-3/09/10, published Oct. 1, 2009.
Probert, "Windows Kernel Internals Cache Manager," Microsoft Corporation, http://www.i.u-tokyo.ac.jp/edu/training/ss/lecture/new-documents/Lectures/15-CacheManager/CacheManager.pdf, printed May 15, 2010.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org/Documents/UploadedDocuments/docs2008/e07154r6-Data_Set_Management_Proposal_for_ATA-ACS2.pdf, printed Apr. 5, 2010.
Spansion, "Data Management Software (DMS) for AMD Simultaneous Read/Write Flash Memory Devices", published Jul. 7, 2003.
Spillane, "Enabling Transactional File Access via Lightweight Kernel Extensions", Stony Brook University, IBM T. J. Watson Research Center, published Feb. 25, 2009.
State Intellectual Property Office, Office Action, CN Application No. 200780050970.0, dated Jun. 29, 2011.
State Intellectual Property Office, Office Action, CN Application No. 200780050970.0, dated Oct. 28, 2010.
State Intellectual Property Office, Office Action, CN Application No. 200780051020.X, dated Nov. 11, 2010.

(56) References Cited

OTHER PUBLICATIONS

State Intellectual Property Office, Office Action, CN Application No. 200780050983.8, dated May 18, 2011.
State Intellectual Property Office, Office Action, CN Application No. 200780051020.X, dated Jul. 6, 2011.
State Intellectual Property Office, Office Action, CN Application No. 200780051020.X, dated Nov. 7, 2011.
State Intellectual Property Office, Office Action, CN Application No. 200780050970.0, dated Jan. 5, 2012.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.
USPTO, Notice of Allowance for U.S. Appl. No. 12/986,117, dated Apr. 4, 2013.
USPTO, Notice of Allowance for U.S. Appl. No. 12/986,117 dated Jun. 5, 2013.
USPTO, Office Action for U.S. Appl. No. 12/986,117, dated Jun. 25, 2013.
USPTO, Office Action for U.S. Appl. No. 12/879,004 dated Feb. 25, 2013.
USPTO, Office Action for U.S. Appl. No. 13/607,486 dated Jan. 10, 2013.
USPTO, Office Action for U.S. Appl. No. 11/952,113, dated Dec. 15, 2010.
USPTO, Office Action for U.S. Appl. No. 12/711,113, dated Mar. 6, 2012.
USPTO, Office Action for U.S. Appl. No. 12/711,113, dated Jun. 6, 2012.
USPTO, Office Action for U.S. Appl. No. 12/711,113, dated Nov. 23, 2012.
USPTO, Office Action for U.S. Appl. No. 13/607,486 dated May 2, 2013.
USPTO, Office Action for U.S. Appl. No. 13/118,237 dated Apr. 22, 2013.
USPTO, Office Action, U.S. Appl. No. 11/952,109, dated May 1, 2012.
USPTO, Office Action, U.S. Appl. No. 11/952,109, dated Nov. 29, 2011.
Van Hensbergen, "Dynamic Policy Disk Caching for Storage Networking," IBM Research Division, RC24123, Nov. 2006.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T599_WHO8.pptx, Printed Apr. 6, 2010, 8 pgs.
Wikipedia, "Object Storage Device," http://en.wikipedia.org/wiki/Object-storage-device, last visited Apr. 29, 2010.

\* cited by examiner

SYSTEMS AND METHODS FOR PERSISTENT ADDRESS SPACE MANAGEMENT

CROSS-REFERENCE TO RELATED APPLICATIONS

This application is a continuation of, and claims priority to, U.S. patent application Ser. No. 13/330,554, entitled "Apparatus, System, and Method for Persistent Data Management on a Non-Volatile Storage Media," filed on Dec. 19, 2011 for David Atkisson et al., and which claims priority to U.S. Provisional Patent Application No. 61/424,585, entitled "Apparatus, System, and Method for Persistent Management of Data in a Cache Device," filed on Dec. 17, 2010, and to U.S. Provisional Patent Application No. 61/425,167, entitled "Apparatus, System and Method for Persistent Management of Data in a Cache Device," filed on Dec. 20, 2010, each of which is hereby incorporated by reference in its entirety.

TECHNICAL FIELD

The present disclosure relates generally to caching data on a solid state storage device and, in particular, to maintaining information pertaining to the cache and the solid state storage device for use in managing the cache after an invalid device shutdown.

BACKGROUND

Cache devices are storage devices that allow quick data access in a system. Caches can significantly improve performance in systems by reducing the input/output (I/O) time for operations that use the data in the cache. Generally, the cache is implemented in front of another storage device which may have greater storage capacity, but slower I/O times, than the cache device. The benefits of caches are well understood and caches have been implemented advantageously in a variety of contexts and scales ranging from the caches in CPUs to caches in storage area networks (SANs).

Currently, invalid data stored on cache devices, and solid-state storage devices in general, after an improper shutdown (e.g., an abrupt loss of power or the like) may be improperly considered as valid data by a system. Similarly, storage systems may incorporate TRIM messages to identify data that may be removed from a non-volatile storage media. The effect of a TRIM message may be obviated due to loss of volatile metadata. Accordingly, systems and methods are needed to better manage data stored on a cache and/or solid-state storage device following improper device shutdowns.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
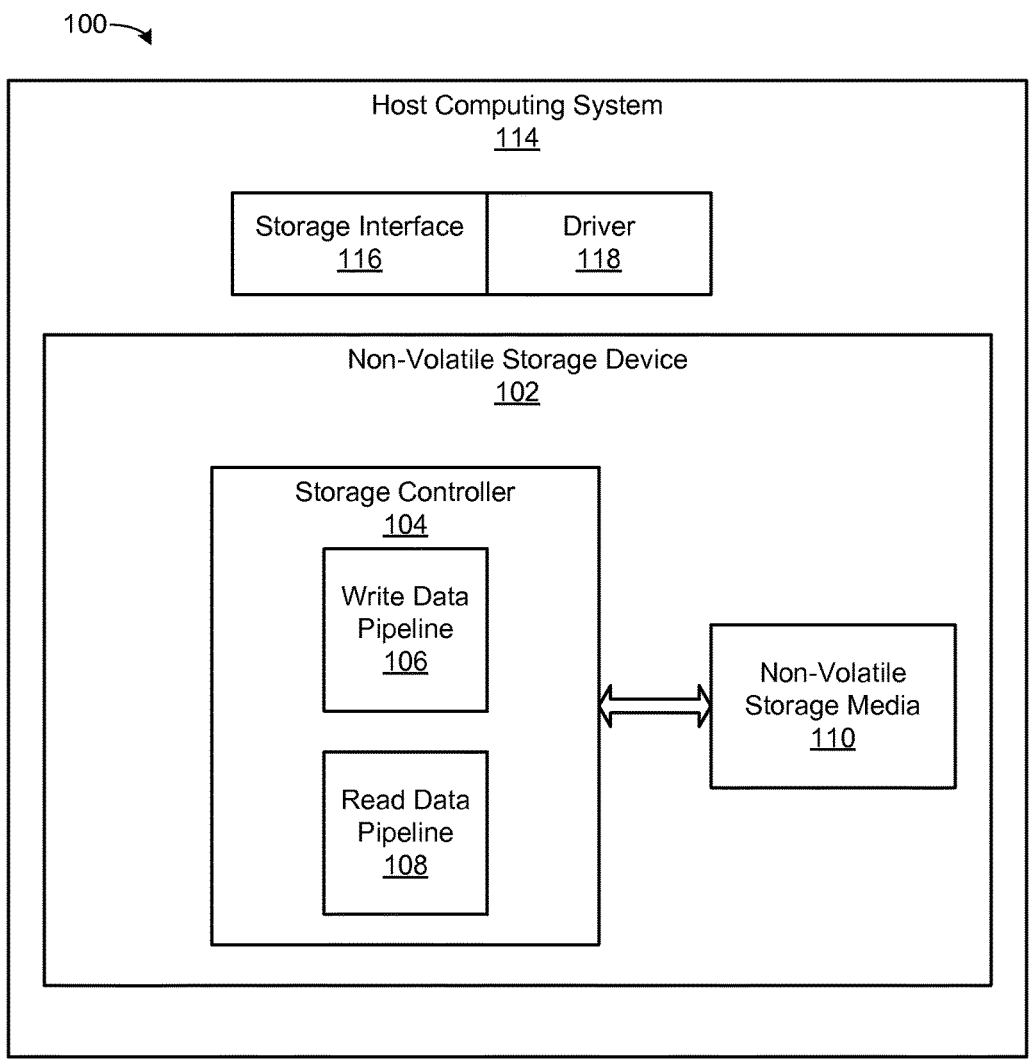
FIG. 1 is a block diagram of a system comprising a non-volatile storage device.

FIG. 1 depicts one embodiment of a system 100 comprising a non-volatile storage device 102. In the depicted embodiment, the system 100 includes a host computing system 114, a throughput management apparatus 122, and a storage device 102. The host computing system 114 may be a computer such as a server, laptop, desktop, a mobile device, or other computing device known in the art. The host computing system 114 typically includes components such as memory, processors, buses, and other components as known to those of skill in the art.

The host computing system 114 stores data in the storage device 102 and communicates data with the storage device 102 via a communications connection. The storage device 102 may be internal to the host computing system 114 or external to the host computing system 114. The communications connection may be a bus, a network, or other manner of connection allowing the transfer of data between the host computing system 114 and the storage device 102. In one embodiment, the storage device 102 is connected to the host computing system 114 by a PCI connection such as PCI express ("PCI-e"). The storage device 102 may be a card that plugs into a PCI-e connection on the host computing system 114.

The storage device 102, in the depicted embodiment, performs data storage operations such as reads, writes, erases, etc. In certain embodiments, a power connection and the communications connection for the storage device 102 are part of the same physical connection between the host computing system 114 and the storage device 102. For example, the storage device 102 may receive power over PCI, PCI-e, serial advanced technology attachment ("serial ATA" or "SATA"), parallel ATA ("PATA"), small computer system interface ("SCSI"), IEEE 1394 ("FireWire"), Fiber Channel, universal serial bus ("USB"), PCIe-AS, or another connection with the host computing system 114.

The storage device 102 provides nonvolatile storage for the host computing system 114. FIG. 1 shows the storage device 102 as a nonvolatile non-volatile storage device 102 comprising a storage controller 104, a write data pipeline 106, a read data pipeline 108, and nonvolatile non-volatile storage media 110. The storage device 102 may contain additional components that are not shown in order to provide a simpler view of the storage device 102.

The non-volatile storage media 110 stores data such that the data is retained even when the storage device 102 is not powered. In some embodiments, the non-volatile storage media 110 comprises a solid-state storage media, such as flash memory, nano random access memory ("NRAM"), magneto-resistive RAM ("MRAM"), dynamic RAM ("DRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), and the like. While, in the depicted embodiment, the storage device 102 includes non-volatile storage media 110, in other embodiments, the storage device 102 may include magnetic media such as hard disks, tape, and the like, optical media, or other nonvolatile data storage media. The storage device 102 also includes a storage controller 104 that coordinates the storage and retrieval of data in the non-volatile storage media 110. The storage controller 104 may use one or more indexes to locate and retrieve data, and perform other operations on data stored in the storage device 102. For example, the storage controller 104 may include a groomer for performing data grooming operations such as garbage collection.

As shown, the storage device 102, in certain embodiments, implements a write data pipeline 106 and a read data pipeline 108, an example of which is described in greater detail below. The write data pipeline 106 may perform certain operations on data as the data is transferred from the host computing system 114 into the non-volatile storage media 110. These operations may include, for example, error correction code (ECC) generation, encryption, compression, and others. The read data pipeline 108 may perform similar and potentially inverse operations on data that is being read out of non-volatile storage media 110 and sent to the host computing system 114.

In one embodiment, the host computing system 114 includes one or more other components in addition to the storage device 102, such as additional storage devices, graphics processors, network cards, and the like. Those of skill in the art, in view of this disclosure, will appreciate the different types of components that may be in a host computing system 114. The components may be internal or external to the host computing system 114. In one embodiment, some of the components may be PCI or PCI-e cards that connect to the host computing system 114 and receive power through the host computing system 114.

In some embodiments, the driver 118, or alternatively the storage interface 116, is an application program interface ("API") and acts to translate commands and other data to a form suitable to be sent to a storage controller 104. In another embodiment, the driver 118 includes one or more functions of the storage controller 104. For example, the driver 118 may include all or a portion of the modules described below and may include one or more indexes or maps for the storage devices 106. The driver 118, one or more storage controllers 104, and one or more storage devices 106 comprising the storage system 102 have a storage interface 116 connection to a file system/file server and allocation traditionally done in a file system/file server is advantageously pushed down (i.e., offloaded) to the storage system 102.

A logical identifier, as used in this application, is an identifier of a data unit that differs from a physical address where data of the data unit is stored. A data unit, as used in this application, is any set of data that is logically grouped together. A data unit may be a file, an object, a data segment of a redundant array of inexpensive/independent disks/drives ("RAID") data stripe, or other data set used in data storage. The data unit may be executable code, data, metadata, directories, indexes, any other type of data that may be stored in a memory device, or a combination thereof. The data unit may be identified by a name, by a logical address, a physical address, an address range, or other convention for identifying data units. A logical identifier includes data unit identifiers, such as a file name, an object identifier, an Mode, Universally Unique Identifier ("UUID"), Globally Unique Identifier ("GUID"), or other data unit label, and may also include a logical block address ("LBA"), cylinder/head/sector ("CHS"), or other lower level logical identifier. A logical identifier generally includes any logical label that can be mapped to a physical location.

In some embodiments, the storage device 106 stores data in a sequential log-based format on the non-volatile storage media 110. For example, when a data unit is modified, data of the data unit is read from one physical storage unit, modified, and then written to a different physical storage unit. The order and sequence of writing data to the data storage device 106 may comprise an event log of the sequence of storage operations performed on the non-volatile storage device 102. By traversing the event log (and/or replaying the sequence of storage operations), volatile storage metadata, such as a forward index can be constructed or reconstructed.

In a typical random access device, logical identifiers have almost a one-to-one correspondence to physical addresses of the random access device. This one-to-one mapping in a typical random access device (excluding a small number of physical addresses on the random access device reserved for bad block mapping) also correlates to a near one-to-one relationship between storage capacity associated with logical identifiers and physical capacity associated with physical addresses. For example, if a logical identifier is a logical block address ("LBA"), each logical block associated with an LBA has a fixed size. A corresponding physical block on the random access device is typically the same size as a logical block. This enables a typical file server 114/file system to manage physical capacity on the random access device by managing logical identifiers, such as LBAs. This continuity of LBA to PBA mapping is generally depended upon and utilized by file systems to defragment the data stored on the data storage device. Similarly, some systems may use this continuity to locate the data on specific physical tracks to improve performance as is the case of a technique called "short stroking" the disk drive. The highly predictable LBA to PBA mapping is essential in certain applications to indirectly manage the storage of the data in the physical storage space through direct management of the logical address space.

However, the storage system 102 may be a log structured file system such that there is no "fixed" relationship or algorithm to determine the mapping of the LBA to the PBA, or in another embodiment, may be random access, but may be accessed by more than one client 110 or file server 114/file system such that the logical identifiers allocated to each client 110 or file server 114/file system represent a storage capacity much larger than the one-to-one relationship of logical to physical identifiers of typical systems. The storage system 102 may also be thinly provisioned such that one or more clients 110 each has an allocated logical address range that is much larger than the storage capacity of the storage devices 106 in the storage system 102. In the system 100, the storage system 102 manages and allocates logical identifiers such that there is no pre-determined one-to-one or near one-to-one relationship between logical identifiers and physical identifiers.

The system 100 is advantageous because it allows more efficient management of storage capacity than typical storage systems. For example, for typical random access devices accessible by a number of clients 110, if each client is allocated a certain amount storage space, the storage space typically will exist and be tied up in the allocations even if the actual amount of storage space occupied is much less. The system 100 is also advantageous because the system 100 reduces complexity of standard thin provisioning systems connected to storage devices 106. A standard thin provisioning system has a thin provisioning layer comprising a logical-to-logical mapping between logical identifiers in the space logical address space and physical storage (e.g., particular physical storage units). The system 100 is more efficient because multiple layers of mapping are eliminated and thin provisioning (logical-to-physical mapping) is done at the lowest level.

Figure 2:
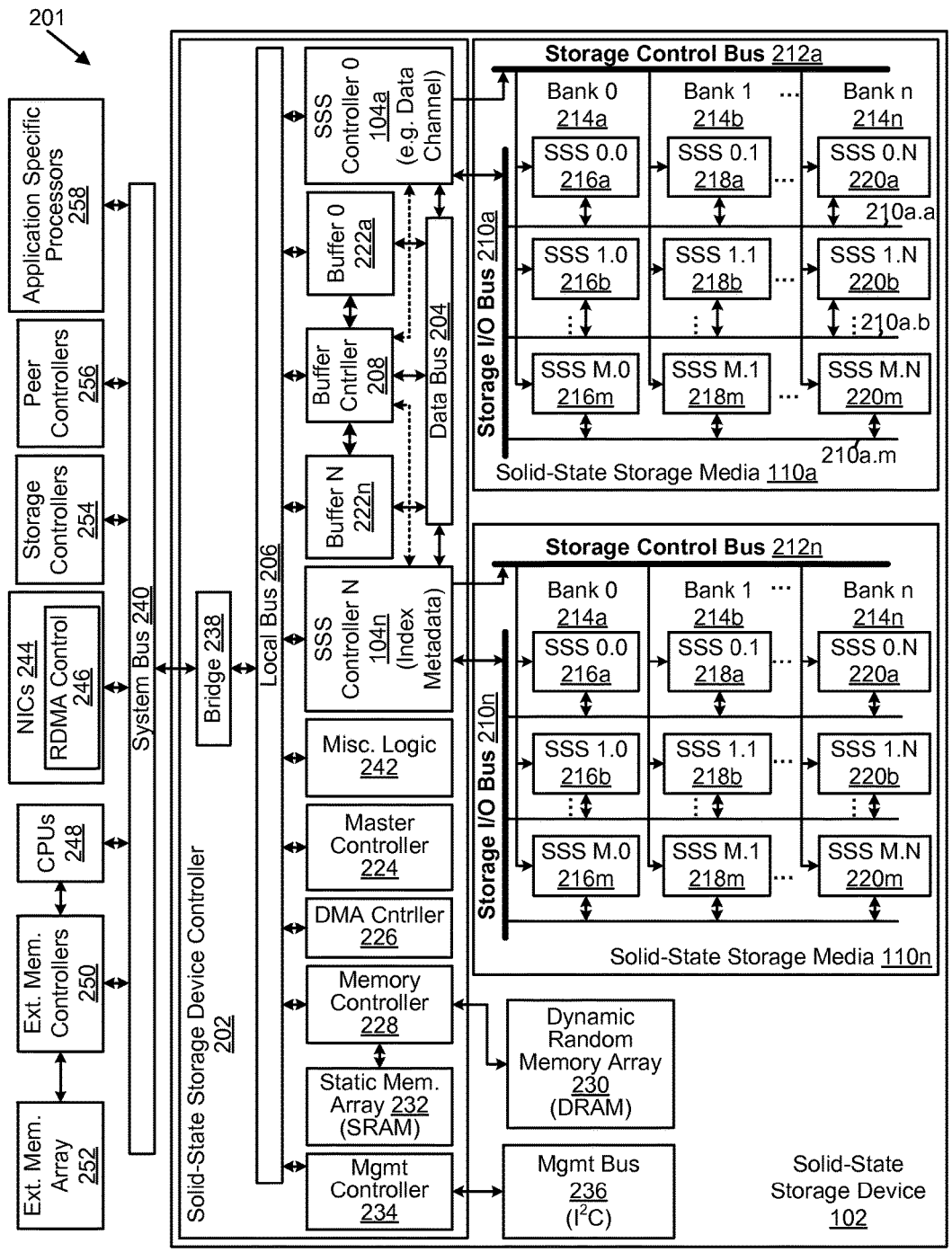
FIG. 2 is a block diagram of one embodiment of a non-volatile storage device.

FIG. 2 is a schematic block diagram illustrating one embodiment 200 of a non-volatile storage device controller 202 that includes a write data pipeline 106 and a read data pipeline 108 in a non-volatile storage device 102 in accordance with the present invention. The non-volatile storage device controller 202 may include a number of storage controllers 0-N 104a-n, each controlling non-volatile storage media 110. In the depicted embodiment, two non-volatile controllers are shown: non-volatile controller 0 104a and storage controller N 104n, and each controlling respective non-volatile storage media 110a-n. In the depicted embodiment, storage controller 0 104a controls a data channel so that the attached non-volatile storage media 110a stores data. Storage controller N 104n controls an index metadata channel associated with the stored data and the associated non-volatile storage media 110n stores index metadata. In an alternate embodiment, the non-volatile storage device controller 202 includes a single non-volatile controller 104a with a single non-volatile storage media 110a. In another embodiment, there are a plurality of storage controllers 104a-n and associated non-volatile storage media 110a-n. In one embodiment, one or more non-volatile controllers 104a-104n-1, coupled to their associated non-volatile storage media 110a-110n-1, control data while at least one storage controller 104n, coupled to its associated non-volatile storage media 110n, controls index metadata.

In one embodiment, at least one non-volatile controller 104 is a field-programmable gate array ("FPGA") and controller functions are programmed into the FPGA. In a particular embodiment, the FPGA is a Xilinx® FPGA. In another embodiment, the storage controller 104 comprises components specifically designed as a storage controller 104, such as an application-specific integrated circuit ("ASIC") or custom logic solution. Each storage controller 104 typically includes a write data pipeline 106 and a read data pipeline 108, which are describe further in relation to FIG. 3. In another embodiment, at least one storage controller 104 is made up of a combination FPGA, ASIC, and custom logic components.

The non-volatile storage media 110 is an array of non-volatile storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the non-volatile storage media 110, data cannot be read from the non-volatile storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A non-volatile storage element (e.g., SSS 0.0 216a) is typically configured as a chip (a package of one or more dies) or a die on a circuit board. As depicted, a non-volatile storage element (e.g., 216a) operates independently or semi-independently of other non-volatile storage elements (e.g., 218a) even if these several elements are packaged together in a chip package, a stack of chip packages, or some other package element. As depicted, a row of non-volatile storage elements 216a, 216b, 216m is designated as a bank 214. As depicted, there may be "n" banks 214a-n and "m" non-volatile storage elements 216a-m, 218a-m, 220a-m per bank in an array of n×m non-volatile storage elements 216, 218, 220 in a non-volatile storage media 110. Of course, different embodiments may include different values for n and m. In one embodiment, a non-volatile storage media 110a includes twenty non-volatile storage elements 216a-216m per bank 214 with eight banks 214. In one embodiment, the non-volatile storage media 110a includes twenty-four non-volatile storage elements 216a-216m per bank 214 with eight banks 214. In addition to the n×m storage elements 216a-216m, 218a-218m, 220a-220m, one or more additional columns (P) may also be addressed and operated in parallel with other non-volatile storage elements 216a, 216b, 216m for one or more rows. The added P columns in one embodiment, store parity data for the portions of an ECC chunk (i.e., an ECC codeword) that span m storage elements for a particular bank. In one embodiment, each non-volatile storage element 216, 218, 220 is comprised of single-level cell ("SLC") devices. In another embodiment, each non-volatile storage element 216, 218, 220 is comprised of multi-level cell ("MLC") devices.

In one embodiment, non-volatile storage elements that share a common line 211 on the storage I/O bus 210a (e.g., 216b, 218b, 220b) are packaged together. In one embodiment, a non-volatile storage element 216, 218, 220 may have one or more dies per package with one or more packages stacked vertically and each die may be accessed independently. In another embodiment, a non-volatile storage element (e.g., SSS 0.0 216a) may have one or more virtual dies per die and one or more dies per package and one or more packages stacked vertically and each virtual die may be accessed independently. In another embodiment, a non-volatile storage element SSS 0.0 216a may have one or more virtual dies per die and one or more dies per package with some or all of the one or more dies stacked vertically and each virtual die may be accessed independently.

In one embodiment, two dies are stacked vertically with four stacks per group to form eight storage elements (e.g., SSS 0.0-SSS 8.0) 216a, 218a . . . 220a, each in a separate bank 214a, 214b . . . 214n. In another embodiment, 24 storage elements (e.g., SSS 0.0-SSS 0.24) 216a, 216b, . . . 216m form a logical bank 214a so that each of the eight logical banks has 24 storage elements (e.g., SSS0.0-SSS 8.24) 216, 218, 220. Data is sent to the non-volatile storage media 110 over the storage I/O bus 210 to all storage elements of a particular group of storage elements (SSS 0.0-SSS 8.0) 216a, 218a, 220a. The storage control bus 212a is used to select a particular bank (e.g., Bank 0 214a) so that the data received over the storage I/O bus 210 connected to all banks 214 is written just to the selected bank 214a.

In one embodiment, the storage I/O bus 210 is comprised of one or more independent I/O buses ("IIOBa-m" comprising 210a.a-m . . . 210n.a-m) wherein the non-volatile storage elements within each column share one of the independent I/O buses that are connected to each non-volatile storage element 216, 218, 220 in parallel. For example, one independent I/O bus 210a.a of the storage I/O bus 210a may be physically connected to a first non-volatile storage element 216a, 218a, 220a of each bank 214a-n. A second independent I/O bus 210a.b of the storage I/O bus 210b may be physically connected to a second non-volatile storage element 216b, 218b, 220b of each bank 214a-n. Each non-volatile storage element 216a, 216b, 216m in a bank 214a (a row of non-volatile storage elements as illustrated in FIG. 2) may be accessed simultaneously and/or in parallel. In one embodiment, where non-volatile storage elements 216, 218, 220 comprise stacked packages of dies, all packages in a particular stack are physically connected to the same independent I/O bus. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one package within a stack of packages. In other embodiments, other commands are used by the storage control bus 212 to individually select one package within a stack of packages. Non-volatile storage elements 216, 218, 220 may also be selected through a combination of control signals and address information transmitted on storage I/O bus 210 and the storage control bus 212.

In one embodiment, each non-volatile storage element 216, 218, 220 is partitioned into erase blocks and each erase block is partitioned into pages. An erase block on a non-volatile storage element 216, 218 220 may be called a physical erase block or "PEB." A typical page is 2048 bytes ("2 kB"). In one example, a non-volatile storage element (e.g., SSS 0.0) includes two registers and can program two pages so that a two-register non-volatile storage element 216, 218, 220 has a capacity of 4 kB. A bank 214 of 20 non-volatile storage elements 216a, 216b, 216m would then have an 80 kB capacity of pages accessed with the same address going out the independent I/O buses of the storage I/O bus 210.

This group of pages in a bank 214 of non-volatile storage elements 216a, 216b, . . . 216m of 80 kB may be called a logical page or virtual page. Similarly, an erase block of each storage element 216a, 216b, . . . 216m of a bank 214a may be grouped to form a logical erase block (which may also be called a virtual erase block). In one embodiment, an erase block of pages within a non-volatile storage element is erased when an erase command is received within the non-volatile storage element. Whereas the size and number of erase blocks, pages, planes, or other logical and physical divisions within a non-volatile storage element 216, 218, 220 are expected to change over time with advancements in technology, it is to be expected that many embodiments consistent with new configurations are possible and are consistent with the general description herein.

Typically, when a packet is written to a particular location within a non-volatile storage element 216, wherein the packet is intended to be written to a location within a particular page which is specific to a particular physical erase block of a particular storage element of a particular bank, a physical address is sent on the storage I/O bus 210 and is followed by the packet. The physical address contains enough information for the non-volatile storage element 216 to direct the packet to the designated location within the page. Since all storage elements in a column of storage elements (e.g., SSS 0.0-SSS N.0 216a, 218a, . . . 220a) are connected to the same independent I/O bus (e.g., 210.a.a) of the storage I/O bus 210a, to reach the proper page and to avoid writing the data packet to similarly addressed pages in the column of storage elements (SSS 0.0-SSS N.0 216a, 218a, . . . 220a), the bank 214a that includes the non-volatile storage element SSS 0.0 216a with the correct page where the data packet is to be written is selected by the storage control bus 212a and other banks 214b . . . 214n of the non-volatile storage 110a are deselected.

Similarly, satisfying a read command on the storage I/O bus 210 requires a signal on the storage control bus 212 to select a single bank 214a and the appropriate page within that bank 214a. In one embodiment, a read command reads an entire page, and because there are multiple non-volatile storage elements 216a, 216b, . . . 216m in parallel in a bank 214a, an entire logical page is read with a read command. However, the read command may be broken into subcommands, as will be explained below with respect to bank interleave. Similarly, an entire logical page may be written to the non-volatile storage elements 216a, 216b, . . . 216m of a bank 214a in a write operation.

An erase block erase command may be sent out to erase an erase block over the storage I/O bus 210 with a particular erase block address to erase a particular erase block. Typically, storage controller 104a may send an erase block erase command over the parallel paths (independent I/O buses 210a-n.a-m) of the storage I/O bus 210 to erase a logical erase block, each with a particular erase block address to erase a particular erase block. Simultaneously, a particular bank (e.g., Bank 0 214a) is selected over the storage control bus 212 to prevent erasure of similarly addressed erase blocks in non-selected banks (e.g., Banks 1-N 214b-n). Alternatively, no particular bank (e.g., Bank 0 214a) is selected over the storage control bus 212 (or all of the banks are selected) to enable erasure of similarly addressed erase blocks in all of the banks (Banks 1-N 214b-n) in parallel. Other commands may also be sent to a particular location using a combination of the storage I/O bus 210 and the storage control bus 212. One of skill in the art will recognize other ways to select a particular storage unit using the bi-directional storage I/O bus 210 and the storage control bus 212.

In one embodiment, packets are written sequentially to the non-volatile storage media 110. For example, storage controller 104a streams packets to storage write buffers of a bank 214a of storage elements 216 and, when the buffers are full, the packets are programmed to a designated logical page. Storage controller 104a then refills the storage write buffers with packets and, when full, the packets are written to the next logical page. The next logical page may be in the same bank 214a or another bank (e.g., 214b). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the non-volatile storage media 110. When a copy is made, a new copy of the requested data is created and a new entry is created in the index mapping the new copy of the requested data to the original packets. The new copy of the requested data is also written to the non-volatile storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the non-volatile storage media 110 and allows the solid-storage device controller 202 to monitor storage hot spots and level usage of the various logical pages in the non-volatile storage media 110. Sequentially writing packets also facilitates a powerful, efficient garbage collection system, which is described in detail below. One of skill in the art will recognize other benefits of sequential storage of data packets.

In various embodiments, the non-volatile storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host computing system 114 or may be other devices.

Typically, the storage controller(s) 104 communicate data to the non-volatile storage media 110 over a storage I/O bus 210. In a typical embodiment where the non-volatile storage is arranged in banks 214 and each bank 214 includes multiple storage elements 216a, 216b, 216m accessed in parallel, the storage I/O bus 210 is an array of busses, one for each column of storage elements 216, 218, 220 spanning the banks 214. As used herein, the term "storage I/O bus" may refer to one storage I/O bus 210 or an array of independent data busses wherein individual data busses of the array independently communicate different data relative to one another. In one embodiment, each storage I/O bus 210 accessing a column of storage elements (e.g., 216a, 218a, 220a) may include a logical-to-physical mapping for storage divisions (e.g., erase blocks) accessed in a column of storage elements 216a, 218a, 220a. This mapping (or bad block remapping) allows a logical address mapped to a physical address of a storage division to be remapped to a different storage division if the first storage division fails, partially fails, is inaccessible, or has some other problem.

Data may also be communicated to the storage controller(s) 104 from a requesting device 155 through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically, the data is transferred from the local bus 206 to one or more data buffers 222 as directed by the master controller 224 and the buffer controller 208. The data then flows out of the buffer(s) 222 to the data bus 204, through a non-volatile controller 104, and on to the non-volatile storage media 110 such as NAND flash or other storage media. In one embodiment, data and associated out-of-band metadata ("metadata") arriving with the data is communicated using one or more data channels comprising one or more storage controllers 104a-104n-1 and associated non-volatile storage media 110a-110n-1 while at least one channel (storage controller 104n, non-volatile storage media 110n) is dedicated to in-band metadata, such as index information and other metadata generated internally to the non-volatile storage device 102.

The local bus 206 is typically a bidirectional bus or set of busses that allows for communication of data and commands between devices internal to the non-volatile storage device controller 202 and between devices internal to the non-volatile storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a host computing system 114 or other device in which the non-volatile storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The non-volatile storage device 102 may be packaged to fit internally to a device or as an externally connected device.

The non-volatile storage device controller 202 includes a master controller 224 that controls higher-level functions within the non-volatile storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/non-volatile storage device controller 202 manages multiple data storage devices/non-volatile storage media 110a-n, the master controller 224 divides the work load among internal controllers, such as the storage controllers 104a-n. For example, the master controller 224 may divide an object to be written to the data storage devices (e.g., non-volatile storage media 110a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a host computing system 114 or other device connected to the storage device/non-volatile storage device 102 views the storage device/non-volatile storage device 102 as a block storage device and sends data to specific physical addresses in the storage device/non-volatile storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in a computer such as the host computing system 114, or other device wishing to use the storage device/non-volatile storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host computing system 114 may have access to the computer network 116 through an I/O memory driver using a standard stack API and operating in conjunction with NICs 244.

In one embodiment, the master controller 224 is also a redundant array of independent drive ("RAID") controller. Where the data storage device/non-volatile storage device 102 is networked with one or more other data storage devices/non-volatile storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g., switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/non-volatile storage device 102 may appear as a storage device connected through a SCSI bus, Internet SCSI ("iSCSI"), fiber channel, etc. Meanwhile the storage device/non-volatile storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/non-volatile storage device 102 to be partitioned into multiple logical devices and allows partition-based media encryption. In yet another embodiment, the master controller 224 supports a storage controller 104 with advanced, multibit ECC correction. One of skill in the art will recognize other features and functions of a master controller 224 in a storage controller 202, or more specifically in a non-volatile storage device 102.

In one embodiment, the non-volatile storage device controller 202 includes a memory controller 228, which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the non-volatile storage media 110*n* or other non-volatile memory. One of skill in the art will recognize other uses and configurations of the memory controller 228, dynamic memory array 230, and static memory array 232.

In one embodiment, the non-volatile storage device controller 202 includes a DMA controller 226 that controls DMA operations between the storage device/non-volatile storage device 102 and one or more external memory controllers 250 and associated external memory arrays 252 and CPUs 248. Note that the external memory controllers 250 and external memory arrays 252 are called external because they are external to the storage device/non-volatile storage device 102. In addition, the DMA controller 226 may also control RDMA operations with requesting devices through a NIC 244 and associated RDMA controller 246.

In one embodiment, the non-volatile storage device controller 202 includes a management controller 234 connected to a management bus 236. Typically, the management controller 234 manages environmental metrics and status of the storage device/non-volatile storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically, the management bus 236 is connected to the various components within the storage device/non-volatile storage device 102. The management controller 234 may communicate alerts, interrupts, etc. over the local bus 206 or may include a separate connection to a system bus 240 or other bus. In one embodiment, the management bus 236 is an Inter-Integrated Circuit ("I2C") bus. One of skill in the art will recognize other related functions and uses of a management controller 234 connected to components of the storage device/non-volatile storage device 102 by a management bus 236.

In one embodiment, the non-volatile storage device controller 202 includes miscellaneous logic 242 that may be customized for a specific application. Typically, where the non-volatile device controller 202 or master controller 224 is/are configured using a FPGA or other configurable controller, custom logic may be included based on a particular application, customer requirement, storage requirement, etc.

Figure 3:
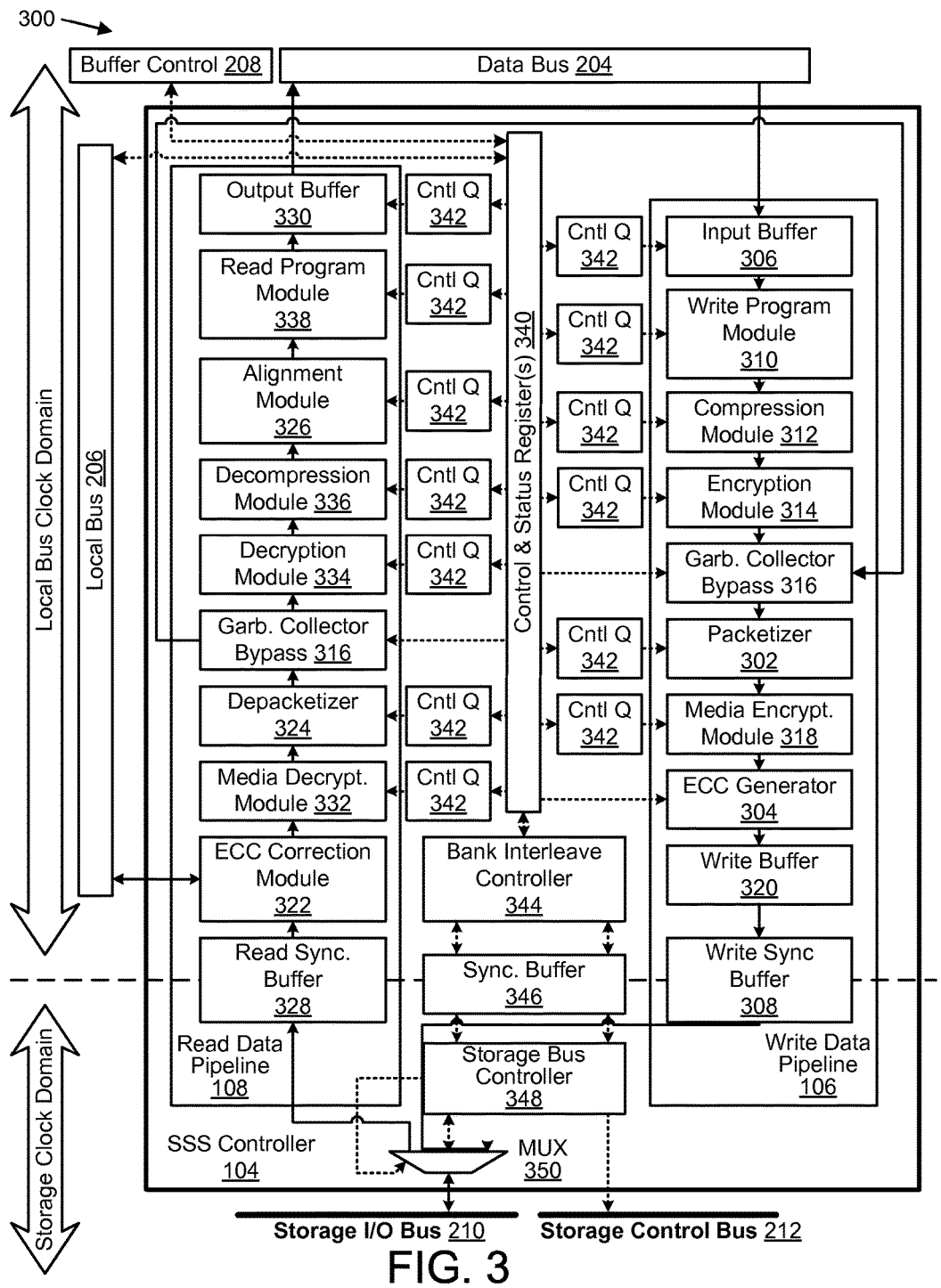
FIG. 3 is a block diagram of one embodiment of a storage controller comprising a write data pipeline and a read data pipeline.

FIG. 3 is a schematic block diagram illustrating one embodiment 300 of a storage controller 104 with a write data pipeline 106, a read data pipeline 108 and a throughput management apparatus 122 in a non-volatile storage device 102 in accordance with the present invention. The embodiment 300 includes a data bus 204, a local bus 206, and buffer control 208, which are substantially similar to those described in relation to the non-volatile storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The storage controller 104 may also include control and status registers 340 and control queues 342, a bank interleave controller 344, a synchronization buffer 346, a storage bus controller 348, and a multiplexer ("MUX") 350. The components of the non-volatile controller 104 and associated write data pipeline 106 and read data pipeline 108 are described below. In other embodiments, synchronous non-volatile storage media 110 may be used and synchronization buffers 308 328 may be eliminated.

The write data pipeline 106 includes a packetizer 302 that receives a data or metadata segment to be written to the non-volatile storage, either directly or indirectly through another write data pipeline 106 stage, and creates one or more packets sized for the non-volatile storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the host computing system 114, or other computer or device and is transmitted to the non-volatile storage device 102 in data segments streamed to the non-volatile storage device 102. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error-correcting algorithm to generate ECC check bits, which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended, and output as an encoded block of length N+S. The value of N and S are dependent upon the characteristics of the ECC algorithm, which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the non-volatile storage media 110 to be extended. For example, if flash memory is used as the storage medium in the non-volatile storage media 110, the flash memory may be written approximately 100,000 times without error per erase cycle. This usage limit may be extended using a robust ECC algorithm. Having the ECC generator 304 and corresponding ECC correction module 322 onboard the non-volatile storage device 102, the non-volatile storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the non-volatile storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the non-volatile storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically, when the write data pipeline 106 does not include an input buffer 306, a buffering function is performed elsewhere, such as in the non-volatile storage device 102 but outside the write data pipeline 106, in the host computing system 114, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the non-volatile storage media 110. The write synchronization buffer 308 is located at a boundary between a local clock domain and a non-volatile storage clock domain and provides buffering to account for the clock domain differences. In other embodiments, synchronous non-volatile storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the non-volatile storage device 102 prior to sending the packets to the ECC generator 304. Typically, the entire packet is encrypted, including the headers. In another embodiment, headers are not encrypted. In this document, encryption key is understood to mean a secret encryption key that is managed externally from a storage controller 104.

The media encryption module 318 and corresponding media decryption module 332 provide a level of security for data stored in the non-volatile storage media 110. For example, where data is encrypted with the media encryption module 318, if the non-volatile storage media 110 is connected to a different storage controller 104, non-volatile storage device 102, or server, the contents of the non-volatile storage media 110 typically could not be read without use of the same encryption key used during the write of the data to the non-volatile storage media 110 without significant effort.

In a typical embodiment, the non-volatile storage device 102 does not store the encryption key in non-volatile storage and allows no external access to the encryption key. The encryption key is provided to the storage controller 104 during initialization. The non-volatile storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host computing system 114, a server, key manager, or other device that manages the encryption key to be used by the storage controller 104. In another embodiment, the non-volatile storage media 110 may have two or more partitions and the storage controller 104 behaves as though it was two or more storage controllers 104, each operating on a single partition within the non-volatile storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the non-volatile storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The solid-state storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host computing system 114, another computer, key manager, or other device that holds the encryption key to be used to encrypt the data segment. In one embodiment, encryption keys are transferred to the storage controller 104 from one of a non-volatile storage device 102, host computing system 114, computer, or other external agent, which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the non-volatile storage device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the non-volatile storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the non-volatile storage media 110. For example, where data is encrypted with media encryption unique to the specific non-volatile storage device 102, if the non-volatile storage media 110 is connected to a different storage controller 104, non-volatile storage device 102, or host computing system 114, the contents of the non-volatile storage media 110 typically could not be read without use of the same encryption key used during the write of the data to the non-volatile storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the non-volatile storage device 102 is beneficial so that computing systems 114 or other devices writing data to the non-volatile storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system (also referred to as a "groomer" or grooming operation) typically marks packets that are no longer valid, typically because the packet is marked for deletion or has been modified and the modified data is stored in a different location. At some point, the garbage collection system determines that a particular section (e.g., an erase block) of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the storage controller 104. In one embodiment, the garbage collector bypass 316 is part of an autonomous garbage collector system that operates within the non-volatile storage device 102. This allows the non-volatile storage device 102 to manage data so that data is systematically spread throughout the non-volatile storage media 110 to improve performance, data reliability and to avoid overuse and underuse of any one location or area of the non-volatile storage media 110 and to lengthen the useful life of the non-volatile storage media 110.

The garbage collector bypass 316 coordinates insertion of segments into the write data pipeline 106 with other segments being written by computing systems 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the logical page in order to improve the efficiency of storage within the non-volatile storage media 110 and thereby reduce the frequency of garbage collection.

Grooming may comprise refreshing data stored on the non-volatile storage media 110. Data stored on the non-volatile storage media 110 may degrade over time. The storage controller 104 may comprise a groomer that identifies "stale" data on the non-volatile storage device 102 (data that has not been modified and/or moved for a pre-determined time), and refreshes the stale data by re-writing the data to a different storage unit.

In some embodiments, the garbage collection system, groomer, and/or garbage collection bypass 316 may be temporarily disabled to allow data to be stored contiguously on physical storage units of the non-volatile storage device 102. Disabling the garbage collection system and/or bypass 316 may ensure that data in the write data pipeline 106 is not interleaved with other data.

In some embodiments, the garbage collection and/or groomer may be restricted to a certain portion of the physical storage space of the non-volatile storage device. For example, metadata, such as the reverse index described below, may be periodically persisted to non-volatile storage. The garbage collection and/or grooming may be restricted to operating on portions of the non-volatile storage media that correspond to the persisted metadata.

In one embodiment, the write data pipeline 106 includes a write buffer 320 that buffers data for efficient write operations. Typically, the write buffer 320 includes enough capacity for packets to fill at least one logical page in the non-volatile storage media 110. This allows a write operation to send an entire logical page of data to the non-volatile storage media 110 without interruption. By sizing the write buffer 320 of the write data pipeline 106 and buffers within the read data pipeline 108 to be the same capacity or larger than a storage write buffer within the non-volatile storage media 110, writing and reading data is more efficient since a single write command may be crafted to send a full logical page of data to the non-volatile storage media 110 instead of multiple commands.

While the write buffer 320 is being filled, the non-volatile storage media 110 may be used for other read operations. This is advantageous because other non-volatile devices with a smaller write buffer or no write buffer may tie up the non-volatile storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again, this is inefficient because multiple write/program cycles are required to fill a page.

For depicted embodiment with a write buffer 320 sized larger than a logical page, a single write command, which includes numerous subcommands, can then be followed by a single program command to transfer the page of data from the storage write buffer in each non-volatile storage element 216, 218, 220 to the designated page within each non-volatile storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a logical page of data segments. One of skill in the art will recognize other write buffer 320 configurations that allow a logical page of data to be stored prior to writing the data to the non-volatile storage media 110.

In another embodiment, the write buffer 320 is sized smaller than a logical page so that less than a page of information could be written to a storage write buffer in the non-volatile storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the non-volatile storage media 110 to fill the pages of a logical page prior to programming the data. In this way, a data stall in the write data pipeline 106 would not stall reading from the non-volatile storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

The read data pipeline 108 includes an ECC correction module 322 that determines if a data error exists in ECC blocks a requested packet received from the non-volatile storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the non-volatile storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the non-volatile storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the non-volatile storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the non-volatile storage media 110 prior to processing by the read data pipeline 108. The read synchronization buffer 328 is at the boundary between the non-volatile storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the non-volatile storage device 102 prior to sending the one or more requested packets to the depacketizer 324. Typically, the encryption key used to decrypt data by the media decryption module 332 is identical to the encryption key used by the media encryption module 318. In another embodiment, the non-volatile storage media 110 may have two or more partitions and the storage controller 104 behaves as though it was two or more storage controllers 104 each operating on a single partition within the non-volatile storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host computing system 114, a client, key manager, or other device that manages the encryption key to be used by the storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

The storage controller 104 and or non-volatile storage device 102 may also include a bank interleave controller 344, a synchronization buffer 346, a storage bus controller 348, and a multiplexer ("MUX") 350.

Figure 4:
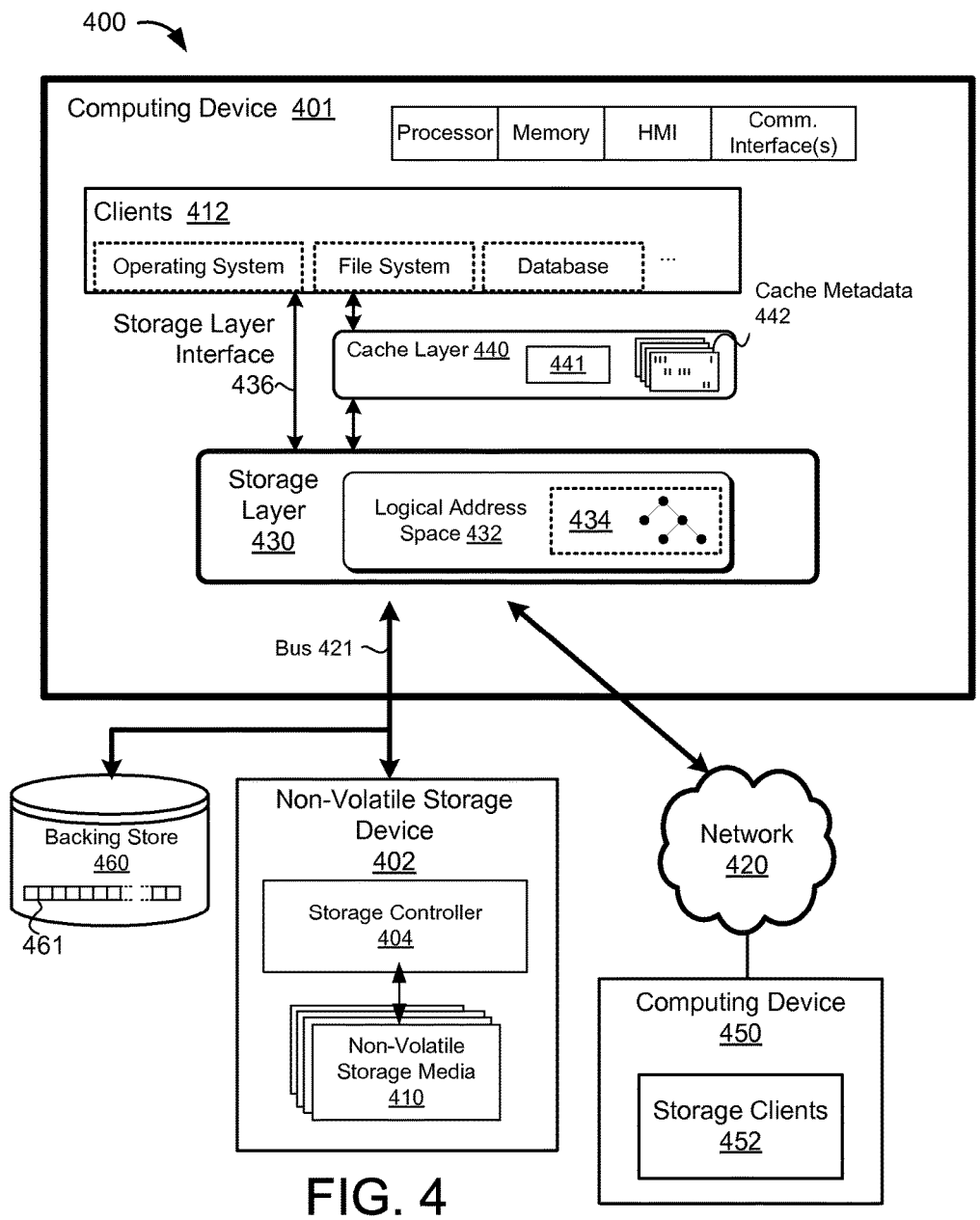
FIG. 4 is a block diagram of one embodiment of a system comprising a storage layer.

In some embodiments, a storage layer provides an interface through which storage clients perform persistent operations. The storage layer may simplify data storage operations for storage clients and expose enhanced storage features, such as atomicity, transactional support, recovery, and so on. FIG. 4 depicts one embodiment of a system 400 comprising a storage layer 430 that presents a logical address space 432 of the non-volatile storage device 402 to storage client applications 412 operating on a computing device 401. The computing device 401 may comprise a processor, non-volatile storage, memory, human-machine interface (HMI) components, communication interfaces (for communication via the network 420), and so on.

The non-volatile storage device 402 may comprise a single non-volatile storage device, may comprise a plurality of non-volatile storage devices, a cluster of storage devices, or other suitable configuration. The storage layer 430 may comprise a driver, kernel-level module, hypervisor, user-space application, or the like. In some embodiments, the storage layer 430 is implemented in conjunction with the driver 118 described above. The storage layer 430 and/or the storage clients 412 may be embodied as instructions stored on a non-volatile storage device.

The storage layer 430 may maintain and present a logical address space 432 to the clients 412 via one or more interfaces and/or APIs provided by the storage layer 430 (storage layer interface 436). As used herein, a logical address space refers to a logical representation of storage resources, such as physical storage units on the non-volatile storage media 410, storage on a backing store 460), or the like. The physical storage units may comprise pages, logical pages, storage divisions, logical storage divisions, sectors, blocks, or other units of storage. The logical address space 432 may comprise a plurality of logical identifiers (LIDs), each corresponding to a respective storage unit. A logical identifier may comprise any identifier capable of being mapped to a storage resource including, but not limited to: a logical block address ("LBA"), cylinder/head/sector ("CHS") address, a file name, an object identifier, an inode, Universally Unique Identifier ("UUID"), Globally Unique Identifier ("GUID"), or other suitable identifier. In some embodiments, the logical identifiers of the logical address space 432 correspond to physical storage units of a particular a storage device, such as the non-volatile storage device 102, backing store 460, or the like. Alternatively, or in addition, the logical identifiers may correspond to storage units of arbitrary size, which may map to one or more physical storage units of a storage device.

The storage layer 430 may provide storage services to the host 114, clients 112, the cache layer 440, through the storage layer interface 436. The clients 412 may include, but are not limited to: operating systems, virtual operating systems (e.g., guest operating systems, hypervisors, etc.), file systems, database applications, server applications, general-purpose applications, and the like. In some embodiments, one or more clients 452 operating on a remote computing device 450 may access the storage layer 430 via a network 420. The storage layer interface 436 may comprise a block device interface and/or one or more extended interfaces.

The storage layer 430 is configured to perform persistent storage operations on the non-volatile storage device 402, which may comprise a non-volatile storage device as described above. The storage layer 430 communicates with the non-volatile storage device 402 via a communication link 421, which may include, but is not limited to: a PCE-e bus, a network connection (e.g., Infiniband), a storage network, Fibre Channel Protocol (FCP) network, HyperSCSI, Universal Serial Bus (USB), IEEE 1394, or other suitable communication link. The storage operations may be configured according to the capabilities and/or configuration of the non-volatile storage device 402. For example, if the non-volatile storage device 402 comprises a write-once, block-erasable device, the storage layer 430 may be configured to perform storage operations accordingly (e.g., store data on initialized or erased storage divisions, etc.).

In some embodiments, the storage layer 430 maintains metadata 434 comprising associations between logical identifiers of the logical address space 432 and physical storage units on the non-volatile storage device 402. The storage layer 430 may maintain "any-to-any" assignments between logical identifiers and physical storage units. Accordingly, there may be no pre-defined mapping between logical identifiers and physical storage units. The storage layer 430 may cause data to be written and/or updated "out-of-place" on the non-volatile storage media 410. In some embodiments, data is stored on the non-volatile storage media 410 in a sequential, log-based format. Storing data sequentially, "out-of-place" provides wear-leveling benefits and addresses "erase-and-program-once" properties of many types of non-volatile storage media 410. Moreover, out-of-place writing (and writing data in logical storage units as opposed to individual pages) addresses asymmetric properties of the non-volatile storage device 402. Asymmetric properties refers to the idea that different storage operations (read, write, erase) take very different amounts of time. For example, it may take ten times as long to program data on a non-volatile storage media 410 as it takes to read data from the non-volatile storage element media 410. Moreover, in some cases, data may only be programmed to physical storage units that have first been initialized (e.g., erased). An erase operation may take ten times as long as a program operation (and by extension one hundred times as long as a read operation). Associations between logical identifiers in the logical address space 432 and physical storage units on the non-volatile storage device 402 are maintained in the volatile metadata 434.

The logical address space 432 may be "sparse" meaning the logical address space 432 is large enough that allocated/assigned logical identifiers are non-contiguous and separated by sections of one or more unallocated/unassigned addresses, and, as such, may comprise a logical capacity that exceeds the physical storage capacity of the non-volatile storage device 402. Accordingly, the logical address space 432 may be defined independent of the non-volatile storage device 402; the logical address space 432 may present a larger address space than the physical storage capacity of the non-volatile storage device 402, may present different storage unit partitions and/or block sizes than provided by the non-volatile storage device 402, and so on. Associations between the logical address space 432 and the non-volatile storage 402 are managed by the storage layer 430 (using the volatile metadata 434). Storage clients 412 may leverage the storage layer interface 436, as opposed to a more limited block-storage layer and/or the other storage interface provided by a particular non-volatile storage device 402.

In some embodiments, the logical address space 432 may be very large, comprising a 64-bit address space referenced by 64-bit logical identifiers (LIDs). Each 64-bit logical identifier in the logical address space 432 (e.g., 64-bit address) references a respective virtual storage unit. As used herein, a virtual storage unit refers to a block of logical storage capacity (e.g., an allocation block). The storage layer 430 may be configured to implement arbitrarily sized virtual storage units; typical sizes range from 512 to 4086 bytes (or even 8 kb to 16 kb depending on the needs of the storage clients 412); the disclosure, however, is not limited in this regard. Since the logical address space 432 (and the virtual storage units therein) is independent of the physical storage capacity and/or storage partitioning of the non-volatile storage device 402, the logical address space 432 may be tailored to the requirements of the storage clients 412.

The storage layer 430 may manage allocations within the logical address space using volatile metadata 434. In some embodiments, the storage layer 430 maintains volatile, storage metadata 434 that tracks allocations of the logical address space 432 using a forward index. The storage layer 430 may allocate ranges within the logical address space 432 for use by particular storage clients 412. Logical identifiers may be allocated for a particular client 412 to persist a storage entity. As used herein, a storage entity refers to any data or data structure in the logical address space 412 that is capable of being persisted to the non-volatile storage device 402; accordingly, a storage entity may include, but is not limited to: file system objects (e.g., files, streams, I-nodes, etc.), a database primitive (e.g., database table, extent, or the like), streams, persistent memory space, memory mapped files, or the like. A storage entity may also be referred to as a Virtual Storage Unit (VSU). A file system object refers to any data structure used by a file system including, but not limited to: a file, a stream, file attributes, file index, volume index, node table, or the like.

As described above, allocating a logical identifier refers to reserving a logical identifier for a particular use or storage client. A logical identifier may refer to a set or range of the logical address space 432 (e.g., a set or range of virtual storage units). The logical capacity of an allocated logical identifier may be determined by the size of the virtual storage units of the logical address space 432. As described above, the logical address space 432 may be configured to present virtual storage units of any pre-determined size. The size of the virtual storage units may be configured by one or more storage clients 412, the storage layer 430, or the like.

An allocated logical identifier, however, may not necessarily be associated with and/or assigned to physical storage units on the non-volatile storage device 402 until required. In some embodiments, the storage layer 430 allocates logical identifiers comprising large, contiguous ranges in the logical address space 432. The availability of large, contiguous ranges in the logical address space 432 is enabled by the large address space (e.g., 64-bit address space) presented by the storage layer 430. For example, a logical identifier allocated for a file may be associated by the storage layer 430 with an address range of 2^32 contiguous virtual storage units in the logical address space 432 for data of the file. If the virtual storage units (e.g., allocation blocks) are 512 bytes each, the allocated logical identifier may represent a logical capacity of two (2) terabytes. The physical storage capacity of the non-volatile storage device 402 may be smaller than two (2) terabytes and/or may be sufficient to store only a small number of such files, such that if logical identifier allocations were to cause equivalent assignments in physical storage space, the storage layer 430 would quickly exhaust the capacity of the non-volatile storage device 402. Advantageously, however, the storage layer 430 is configured to allocate large, contiguous ranges within the logical address space 432 and to defer assigning physical storage units on the non-volatile storage device 402 to the logical identifiers until necessary. Similarly, the storage layer 430 may support the use of "sparse" allocated logical ranges. For example, a client 412 may request that a first data segment be persisted at the "head" of an allocated logical identifier and a second data segment be persisted at the "tail" of an allocated logical identifier. The storage layer 430 may assign only those physical storage units on the non-volatile storage device 402 that are needed to persist the first and second data segments. The storage layer 430 may not assign or reserve physical storage units on the non-volatile storage device 402 for allocated logical identifiers that are not being used to store data.

As discussed above, the storage layer 430 may maintain volatile metadata 434 to track allocations in the logical address space 432 space and to track assignments between logical identifiers in the logical address space 432 and physical storage units on the non-volatile storage media 410. In some embodiments, the storage layer 430 may track both logical allocations and physical storage unit assignments using a single datastructure in the volatile metadata 434. Alternatively, or in addition, the storage layer 430 may be configured to track logical allocations in logical allocation metadata and to track assigned physical storage units on the non-volatile storage media 410 using separate, physical reservation metadata.

Storage clients 412 may access the storage layer 430 via the storage layer interface 436. In some embodiments, storage clients 412 may delegate certain functions to the storage layer 430. For example, and as described above, storage clients 412 may leverage the sequential, log-based data format of the storage layer 430 to delegate crash recovery and/or data integrity functions to the storage layer 430. In some embodiments, storage clients may also delegate allocations in the logical address space 432 and/or physical storage reservations to the storage layer 430.

Typically, a client 412, such as a file system, tracks the logical addresses and/or physical storage units that are available for use. The logical storage units available to the client 412 may be limited to the physical storage capacity of the underlying non-volatile storage device (or partition thereof). Accordingly, the client 412 may maintain a set of logical addresses that "mirrors" the physical storage units of the non-volatile storage device 402. For example, and as shown in FIG. 4, a client 412 may identify one or more available logical block addresses (LBAs) for a new file. Since the LBAs map directly to physical storage units in conventional implementations, the LBAs are unlikely to be contiguous; the availability of contiguous LBAs may depend upon the capacity of the underlying block storage device and/or whether the device is "fragmented." The client 412 then performs block-level operations to store the file through, inter alia, a block storage layer (e.g., a block-device interface). If the underlying storage device provides a one-to-one mapping between logical block address and physical storage units, as with conventional storage devices, the block storage layer performs appropriate LBA-to-physical address translations and implements the requested storage operations. If, however, the underlying non-volatile storage device 402 does not support one-to-one mappings (e.g., the underlying storage device is a sequential, or write-out-of-place device, such as a non-volatile storage device, in accordance with embodiments of this disclosure), another redundant set of translations is needed (e.g., a Flash Translation Layer, or other mapping). The redundant set of translations and the requirement that the client 412 maintain logical address allocations may represent a significant overhead for storage operations performed by the client 412 and may make allocating contiguous LBA ranges difficult or impossible without time-consuming "defragmentation" operations.

In some embodiments, storage clients 412 delegate allocation functionality to the storage layer 430. Storage clients 412 may access the storage layer interface 436 to request logical ranges in the logical address space 432. The storage layer 430 tracks the allocation status of the logical address space 432 using the volatile metadata 434. If the storage layer 430 determines that the requested logical address range is unallocated, the storage layer 430 allocates the requested logical address range for the client 412. If the requested range is allocated (or only a portion of the range is unallocated), the storage layer 430 may return an alternative range in the logical address space 432 and/or may return a failure. In some embodiments, the storage layer 430 may return an alternative range in the logical address space 430 that includes contiguous range of logical addresses. Having a contiguous range of logical addresses often simplifies the management of the storage entity associated with this range of logical addresses. Since the storage layer 430 uses the volatile metadata 434 to maintain associations between the logical address space 432 and physical storage units on the non-volatile storage device 402, no redundant set of address translations is needed. Moreover, the storage layer 430 uses the volatile metadata 434 to identify unallocated logical identifiers, which frees the client 412 from this overhead.

In some embodiments, the storage layer 430 makes allocations within the logical address space 432 as described above. The storage layer 430 may access an index comprising allocated logical address ranges (e.g., forward index of FIG. 5) to identify unallocated logical identifiers, which are allocated to storage clients 412 upon request. For example, the storage layer 430 may maintain volatile metadata 434 comprising a range-encoded tree datastructure, as described above; entries in the tree may represent allocated logical identifiers in the logical address space 432, and "holes" in the tree represent unallocated logical identifiers. Alternatively, or in addition, the storage layer 430 maintains an index of unallocated logical identifiers that can be allocated to storage clients (e.g., without searching a forward index).

Figure 5:
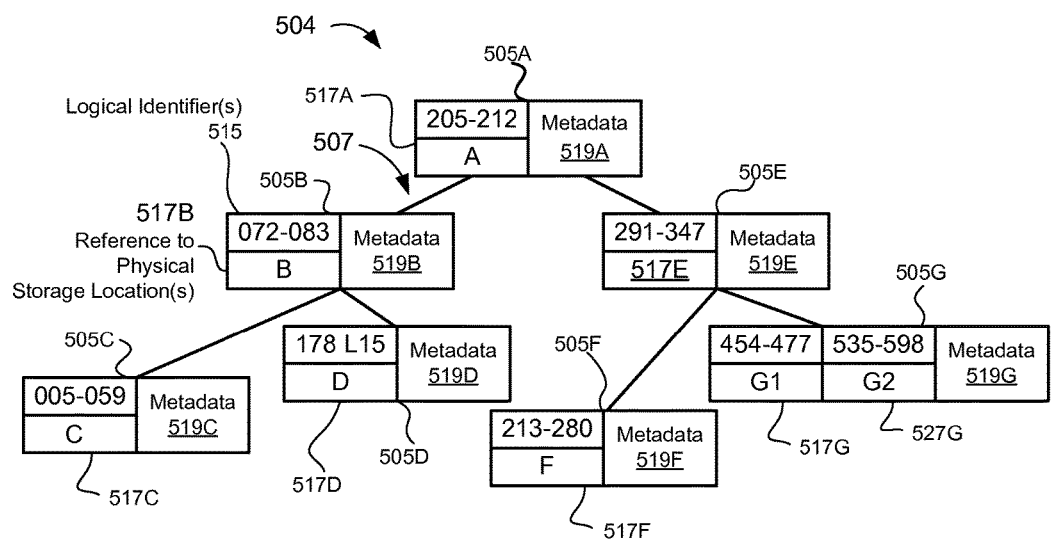
FIG. 5 depicts one embodiment of a forward index.

FIG. 5 depicts one example of volatile metadata 434 and, in particular, a forward index 504 that maintains allocations of the logical address space of one or more non-volatile storage devices (e.g., storage devices 106 described above). The forward index 504 may be further configured to maintain assignments between allocated logical identifiers and physical storage units on a non-volatile storage device. The forward index 504 may be maintained by the storage layer 430, a storage controller (e.g., storage controller 404, described above), and/or a driver (e.g., driver 118 described above), or the like.

In the FIG. 5 example, the datastructure 504 is implemented as a range-encoded B-tree. The disclosure is not limited in this regard, however; the forward index 504 may be implemented using and suitable data structure including, but not limited to: a tree, a B-tree, a range-encoded B-tree, a radix tree, a map, a content addressable map (CAM), a table, a hash table, or other suitable data structure (or combination of data structures).

The forward index 504 comprises a plurality of entries 505 (entries 505A-G), each representing one or more logical identifiers in the logical address space. For example, the entry 505B references logical identifiers 515 (LIDs 072-083). Data may be stored sequentially or "out-of-place" on the non-volatile storage device and, as such, there may be no correspondence between logical identifiers and the physical storage units. The forward index 504 maintains assignments between allocated logical identifiers and physical storage units (e.g., using physical storage unit references 517). For example, the reference 517B assigns the logical identifiers 515 (LIDs 072-083) to one or more physical storage units of the non-volatile storage device. In some embodiments, the references 517 comprise a physical address on the non-volatile storage device. Alternatively, or in addition, the references 517 may correspond to a secondary datastructure (e.g., a reverse index), or the like. The references 517 may be updated in response to changes to the physical storage unit of data (e.g., due to grooming operations, data refresh, modification, overwrite, or the like).

In some embodiments, one or more of the entries 505 may represent logical identifiers that have been allocated to a storage client, but have not been assigned to any particular physical storage units (e.g., the storage client has not caused data to be written to the logical identifiers). The physical storage unit reference 517 of an unassigned entry 505 may be marked as "null" or not assigned.

The entries 505 are arranged into a tree data structure by the edges 507. In some embodiments, the entries 505 are indexed by logical identifier, which provides for fast and efficient entry 505 lookup. In the FIG. 5 example, the entries 505 are arranged in logical identifier order such that the entry 505C references the "lowest" logical identifiers and 505G references the "largest" logical identifiers. Particular entries 505 are accessed by traversing the edges 507 of the forward index 504. In some embodiments, the forward index 504 is balanced, such that all leaf entries 505 are of a similar depth within the tree.

For clarity, the FIG. 5 example depicts entries 505 comprising numeric logical identifiers, however, the disclosure is not limited in this regard, and one of skill in the art will recognize that the entries 505 could comprise any suitable logical identifier representation, including, but not limited to: alpha-numerical characters, hexadecimal characters, binary values, text identifiers, hash codes, or the like.

The entries 505 of the index 504 may reference logical identifiers of variable size and/or length; a single entry 505 may reference a plurality of logical identifiers (e.g., a set of logical identifiers, a logical identifier range, a noncontiguous set of logical identifiers, or the like). For example, the entry 505B represents a contiguous range of logical identifiers 072-083. Other entries of the forward index 504 may represent a noncontiguous set of logical identifiers; entry 505G represents logical identifiers 454-477 and 535-598, each assigned to respective physical storage units by respective references 517G and 527G. The forward index 504 may represent logical identifiers using any suitable technique; for example, the entry 505D references logical identifier 178 and length 15, which corresponds to a range of logical identifiers 178-192.

In some embodiments, the entries 505 comprise and/or reference metadata 519, which may comprise metadata pertaining to the entries 505, such as age, size, logical identifier attributes (e.g., client identifier, data identifier, file name, group identifier), the underlying physical storage unit(s), or the like. The metadata 519 may be indexed by logical identifier (through association with the respective entries 505) and, as such, the metadata 519 may remain associated with entry 505 regardless of changes to the location of the underlying physical storage units of the data.

The forward index 504 may be used to efficiently determine whether the non-volatile storage device comprises a particular logical identifier. In one example, a storage client may request allocation of a particular logical identifier. If the forward index 504 comprises and entry 505 that includes the requested logical identifiers, the logical identifier(s) associated with the request may be identified as being already allocated. If the logical identifiers are not in the index, they may be allocated to the requester by creating a new entry 505 in the forward index 504. In another example, a storage client requests data of a particular logical identifier. The physical storage unit of the data is determined by accessing the reference 517 to the physical storage unit of the entry 505 comprising the logical identifier. In another example, a client modifies data pertaining to a logical identifier. In another example, a storage client modifies existing data of a particular logical identifier. The modified data is written sequentially to a new physical storage unit on the non-volatile storage device, and the physical storage unit reference 517 of the entry 505 in the forward index 504 is updated to reference the physical storage unit of the new data. The obsolete data may be marked as invalid for reclamation in a grooming operation.

The forward index 504 of FIG. 5 maintains a logical address space and, as such, is indexed by logical identifier. As discussed above, entries 505 in forward index 504 may comprise references 517 to physical storage units on a non-volatile storage device. In some embodiments, the references 517 may comprise physical addresses (or address ranges) of the physical storage units. Alternatively, or in addition, the references 517 may be indirect (e.g., reference a secondary datastructure, such as a reverse index).

Figure 6A:
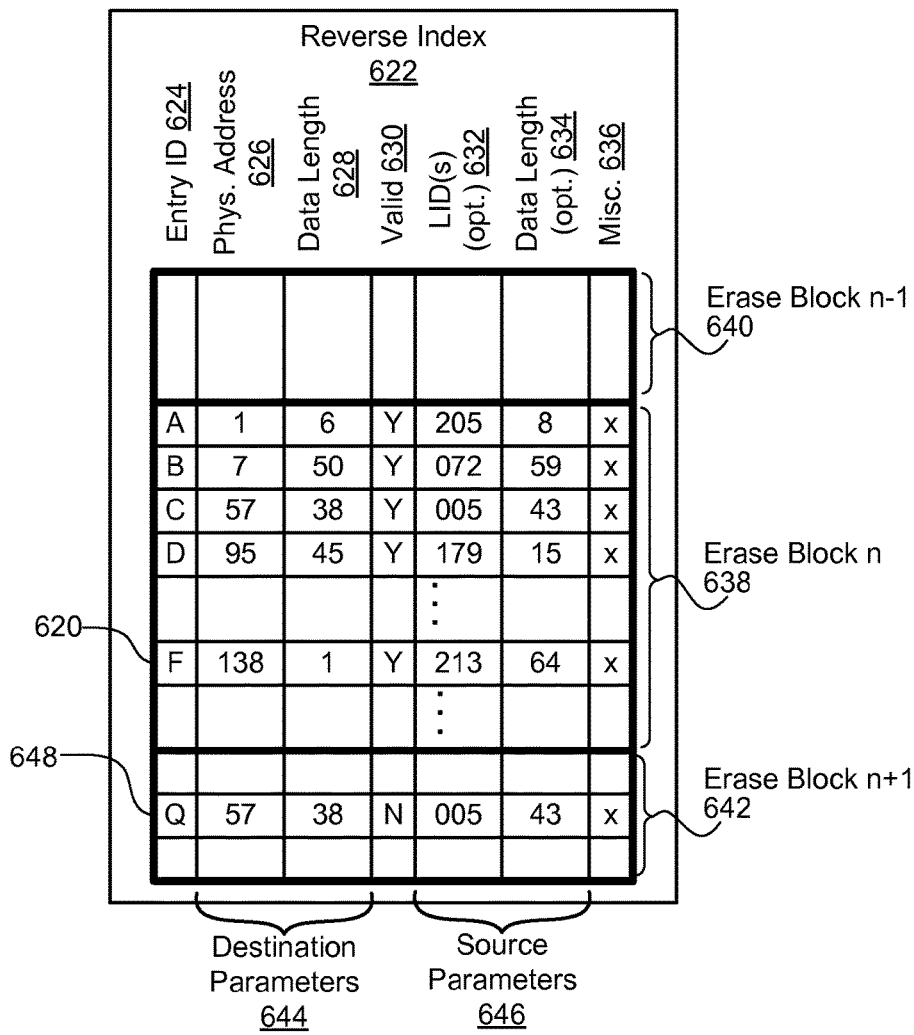
FIG. 6A depicts one embodiment of a reverse index.

FIG. 6A depicts one example of a reverse index 622 for maintaining metadata pertaining to physical storage units of a non-volatile storage device. In the FIG. 6A example, the reverse index 622 is implemented as a table data structure. The disclosure is not limited in this regard, however, and could implement the reverse index 622 using any suitable datastructure. For example, in some embodiments, the reverse index 622 is implemented in the same data structure with the forward index 504 described above (e.g., portions and/or entries of the reverse index 622 may be included as leaf entries of the forward index 504). The reverse index 622 comprises a plurality of entries 620 (depicted as rows in the table datastructure 622), each of which may comprise an entry ID 624, a physical address 626, a data length 628 associated with the data stored at the physical address 626 on the non-volatile storage media 410 (in this case the data is compressed), a valid tag 630, a logical address 632 associated with the data, a data length 634 associated with the logical address 632, and other miscellaneous data 636. In a further embodiment, the reverse index 622 may include an indicator of whether the physical address 626 stores dirty or clean data, or the like.

The reverse index 622 may be organized according to the configuration and/or layout of a particular non-volatile storage device. Accordingly, the reverse index 622 may be arranged by storage divisions (e.g., erase blocks), physical storage units (e.g., pages), logical storage units, or the like. In the FIG. 6A example, the reverse index 622 is arranged into a plurality of erase blocks (640, 638, and 642), each comprising a plurality of physical storage units (e.g., pages, logical pages, or the like).

The entry 620 comprises metadata pertaining to the physical storage unit(s) comprising data of the entry 505F of FIG. 5. The entry 620 indicates that the physical storage unit is within erase block n 638. Erase block n 638 is preceded by erase block n−1 640 and followed by erase block n+1 642. (The contents of erase blocks n−1 and n+1 are not shown).

The entry ID 624 may be an address, a virtual link, or other data to associate entries in the reverse index 622 with entries in the forward index 504 (or other volatile, storage metadata). The physical address 626 indicates a physical address on the non-volatile storage device (e.g., non-volatile storage media 410). The data length 628 associated with the physical address 626 identifies a length of the data stored at the physical address 626. Together the physical address 626 and data length 628 may be referred to as destination parameters 644.

The logical identifier 632 and data length 634 may be referred to as source parameters 646. The logical identifier 632 associates the entry with a logical identifier of the logical address space. The logical identifier 632 may be used to associate an entry in the reverse index 622 with an entry 505 of the forward index 504. The data length 624 refers to the length of the data in the logical address space (e.g., from the perspective of the storage client). The source parameter 646 data length 634 may be different from the destination parameter 644 data length 634 due to, inter alia, data compression, header overhead, encryption overhead, or the like. In the FIG. 6A example, the data associated with the entry 620 is highly compressible and was compressed from 64 blocks in the logical address space to 1 block on the non-volatile storage device.

The valid tag 630 indicates whether the data mapped to the entry 620 is valid. In this case, the data associated with the entry 620 is valid and is depicted in FIG. 6A as a "Y" in the row of the entry 620. As used herein, valid data refers to data that is up-to-date and has not been deleted and/or made obsolete (overwritten or modified). The reverse index 622 may track the validity status of each physical storage unit of the non-volatile storage device. The forward index 504 may comprise entries corresponding to valid data only. In the FIG. 6A example, entry "Q" 648 indicates that data associated with the entry 648 is invalid. Note that the forward index 504 does not include logical addresses associated with entry Q 648. The entry Q 648 may correspond to an obsolete version of the data of entry 505C (overwritten by data now stored at entry "C").

The reverse index 622 may maintain entries for invalid data so that valid and invalid data can be quickly distinguished for storage recovery (e.g., grooming). In some embodiments, the forward index 504 and/or the reverse index 622 may track dirty and clean data in a similar manner to distinguish dirty data from clean data when operating as a cache.

In some embodiments, the reverse index 622 may omit the source parameters 646. For example, if the source parameters 646 are stored with the data, possibly in a header of the stored data, the reverse index 622 may identify a logical address indirectly by including a physical address 626 associated with the data and the source parameters 646 could be identified from the stored data.

The reverse index 622 may also include other miscellaneous data 636, such as a file name, object name, source data, storage client, security flags, atomicity flag, transaction identifier, or the like. One of skill in the art will recognize other information useful in a reverse index 622. While physical addresses 626 are depicted in the reverse index 622, in other embodiments, physical addresses 626, or other destination parameters 644, may be included in other locations, such as in the forward index 504, an intermediate table or data structure, or the like.

The reverse index 622 may be arranged by erase block or erase region (or other storage division) so that traversing a section of the index allows a groomer to identify valid data in a particular storage division (e.g., erase block 638) and to quantify an amount of valid data, or conversely invalid data, therein. The groomer may select storage divisions for recovery based, in part, on the amount of valid and/or invalid data in each division.

Figure 6B:
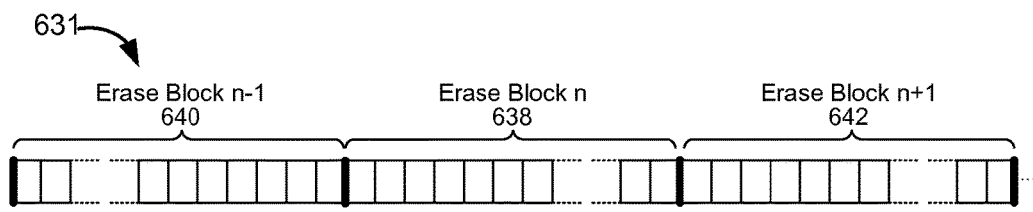
FIG. 6B depicts one embodiment of a validity bitmap.

FIG. 6B depicts a validity bitmap which may be in place of (or in addition to) the reverse index 622 described above. The validity bitmap 631 may comprise a plurality of entries for one or more erase blocks 638, 640, 642, of the non-volatile storage media 410. The entries may comprise a single bit, each bit representing the validity status of a storage unit (e.g., valid or invalid). The validity bitmap 631 of each erase block may be stored in a pre-determined portion of the erase block (and/or within another erase block).

Referring back to FIG. 4, in some embodiments, the storage layer interface 436 may be configured to receive TRIM messages from clients 412. As used herein, a TRIM message refers to a message (e.g., "hint" or "directive") that one or more logical identifiers are no longer in use to reference data on the non-volatile storage media 410 (e.g., that data of the specified logical identifiers can be (or shall be for TRIM directives) erased from the non-volatile storage media 410). A TRIM message may not require that the data be removed immediately; rather, the data may remain on the non-volatile storage media until the storage division upon which the data is stored is erased (e.g., in a subsequent grooming operation). Data of the TRIM message may be "logically invalidated," however. As used herein, "logically invalidating," data of a logical identifier refers to removing one or more references to the data in the volatile metadata 434, such as the forward index 504 and/or reverse index 622, described above. As described below, since the data is invalidated logically (e.g., in the volatile metadata 434), the TRIM message may provide inconsistent results if/when the volatile metadata 434 is lost due to inter alia an invalid shutdown, software fault, memory fault, or the like.

Accordingly, in some embodiments, the storage layer 430 may be configured to store a persistent indicator of a TRIM message (e.g., a persistent note) on the non-volatile storage media 410. The persistent note may ensure that the TRIM message is implemented even if the volatile metadata 434 is lost. Accordingly, the persistent note may be used to exclude logically invalidated data from reconstructed volatile metadata 434. In some embodiments, the storage layer interface 436 provides one or more different TRIM APIs, including a TRIM message (or hint), which does not comprise storing a persistent note, and a TRIM directive that includes storing a persistent note to ensure that the TRIM directive is effective.

As discussed above, the non-volatile storage device 402 may be configured to store data on the non-volatile storage media 410 in a sequential, log-based format. The contents of the non-volatile storage device may, therefore, comprise an ordered "event log" of storage operations on the non-volatile storage media 410. The sequential ordering of storage operations may be maintained by appending data at an append point within the physical storage space of the non-volatile storage device 402. Alternatively, or in addition, sequence information may be maintained through persistent data stored on the non-volatile storage media 410. For example, each storage division (e.g., erase block) on the non-volatile storage media 410 may comprise a respective indicator (e.g., timestamp, sequence number, or other indicator), to indicate an order or sequence of the storage division within the event log.

Persisting data in a sequential, log-based format may comprise persisting metadata on the non-volatile storage device 402 that describes the data. The persistent metadata may be stored with the data itself (e.g., in the same program and/or storage operation and/or in the smallest write unit supported by the non-volatile storage device 402); the persistent metadata may, therefore, be guaranteed to be stored with the data it describes. In some embodiments, data is stored in a container format (e.g., a packet, ECC codeword, etc.). Persistent metadata may be included as part of the packet format of the data (e.g., as a header, footer, or other field within the packet). Alternatively, or in addition, portions of the persistent metadata may be stored separately from the data it describes. In this case, the persistent metadata may be linked to (or otherwise reference) the data it describes (or vice versa). For example, a sequence indicator may be included on a storage division with data.

The persistent metadata describes the data and may include, but is not limited to: a logical identifier (or other identifier) of the data, security or access tracking parameters, sequence information (e.g., a sequence indicator), a persistent metadata flag (e.g., indicating inclusion in an atomic storage operation), a transaction identifier, or the like. The persistent metadata may comprise sufficient information to reconstruct all, or portions, of the metadata 434 and/or replay the sequence of storage operations performed on the non-volatile storage device 402.

As described above, data stored in the sequential, log-based format may comprise an ordered sequence of storage operations (e.g., "event log") performed on the non-volatile storage device 402. Accordingly, the storage layer 430 may be capable of replaying a sequence of storage operations performed on the non-volatile storage device 402 by accessing the data stored on the non-volatile storage media 410 in a particular order that matches the order of the event log. Similarly, the storage layer 430 may be capable of determining the relative ordering data on the non-volatile storage media 410.

Figure 7:
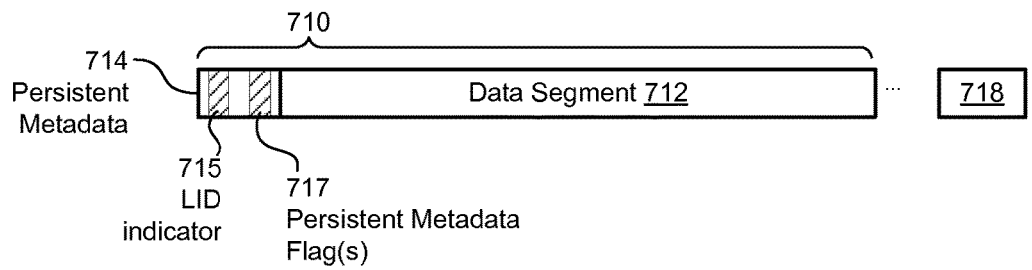
FIG. 7 depicts one embodiment of an append point within a physical storage space of a non-volatile storage device.

FIG. 7 depicts one example of a sequential, log-based data format (packet format 710). A data packet 710 includes data (e.g., a data segment 712) that is associated with one or more logical identifiers. In some embodiments, the data segment 712 comprises compressed, encrypted, and/or whitened data. Furthermore, the data segment 712 may be encoded in one or more error-correcting code datastructures and/or symbols (e.g., ECC codewords, ECC symbols, or the like). The data segment 712 may be a predetermined size (e.g., a fixed "block" or "segment" size). Alternatively, the data segment 712 may be a variable size.

The packet 710 includes persistent metadata 714 that is stored on the non-volatile storage device. In some embodiments, the persistent metadata 714 is stored with the data segment 712 (e.g., as a packet header, footer, or the like). The persistent metadata 714 may include a logical identifier indicator 715 that identifies the logical identifier(s) to which the data segment 712 pertains. The logical identifier indicator 715 may be used to reconstruct the volatile metadata 434, such as the forward index (e.g., forward index 504) and/or reverse index (e.g., reverse index 622). The persistent metadata 714 may further comprise one or more metadata flags 717, which may be used to support atomic storage operations, transactions, or the like.

In some embodiments, the packet 710 is associated with a sequence indicator 718. The sequence indicator 718 may be persisted on the non-volatile storage media (e.g., page) with the data packet 710 and/or on the storage division (e.g., erase block) with the data packet 710. Alternatively, the sequence indicator 718 may be persisted in a separate storage unit. In some embodiments, a sequence indicator 718 is applied when a storage division is made available for use (e.g., when erased, when the first or last storage unit is programmed, or the like). The sequence indicator 718 may be used to determine the temporal sequential ordering of storage operations on the non-volatile storage device.

Referring back to FIG. 4, the sequential, log-based data format enables the storage layer 430 to reconstruct the volatile metadata 434, as well as other data, in the event of an invalid shutdown (or other failure condition). Examples of apparatus, systems, and methods for crash recovery and/or data integrity despite invalid shutdown conditions are described in U.S. Provisional Patent Application No. 61/424,585, entitled, "Apparatus, System, and Method for Persistent Management of Data in a Cache Device," filed Dec. 17, 2010, and in U.S. Provisional Patent Application No. 61/425,167, entitled, "Apparatus, System, and Method for Persistent Management of Data in a Cache Device," filed Dec. 20, 2010, which are hereby incorporated by reference in their entirety. In some embodiments, the non-volatile storage device 402 comprises a secondary power source (e.g., battery, capacitor, etc.) to power the storage controller 404 and/or non-volatile storage media 410 in the event of an invalid shutdown. The non-volatile storage device 402 (or controller 404) may, therefore, comprise a "protection domain" or "powercut safe domain" (defined by the secondary power source 407). Once data is transferred to within the protection domain, of the non-volatile storage device, it may be guaranteed to be persisted on the non-volatile storage media 410. Alternatively, or in addition, the storage controller 404 may be capable of performing storage operations independent of the host computing device 401.

The sequential, log-based storage format implemented by the storage layer 430 provides crash-recovery and/or data integrity for the data stored on the non-volatile storage device 402 as well as the storage metadata 434. After an invalid shutdown and reconstruction operation, the storage layer 430 may expose the reconstructed storage metadata 434 to storage clients 412. The storage clients 412 may, therefore, delegate crash-recovery and/or data integrity to the storage layer 430, which may significantly simplify the storage clients 412 and/or allow the storage clients 412 to operate more efficiently. For example, a file system client 412 may require crash-recovery and/or data integrity services for some of its metadata, such as I-node tables, file allocation tables, and so on. The client 412 may have to implement these services itself, which may impose significant overhead and/or complexity on the client 412. The client 412 may be relieved from this overhead by delegating crash recovery and/or data integrity to the storage layer 430. As described above, the storage layer 430 stores data in a sequential, log-based format. As such, in the event of an invalid shutdown, the storage layer 430 is capable of reconstructing the storage metadata 434 and/or identifying the "current" version of data using the sequential, log-based formatted data on the non-volatile storage device 402. The storage layer 430 provides access to the reconstructed storage metadata 434 and/or data via the storage layer interface 436. Accordingly, after an invalid shutdown, a file system client 412 may access crash-recovered file system metadata and/or may ensure the integrity of file data accessed through the storage layer 430.

Figure 8A:
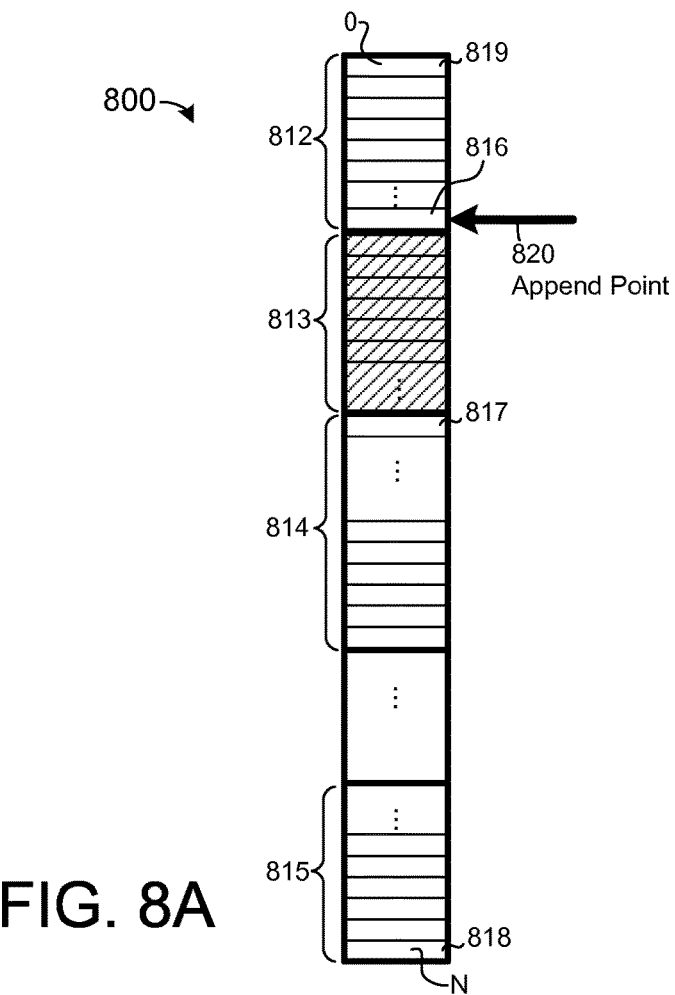
FIG. 8A depicts one example of a sequence of storage operations performed on a non-volatile storage media.

FIG. 8A depicts a physical storage space 800 of a non-volatile storage device. The physical storage space 800 is arranged into storage divisions (e.g., erase blocks 812, 813, 814, and 815), each of which can be initialized (e.g., erased) in a single operation. Each storage division comprises a plurality of physical storage units (e.g., pages or logical pages) capable of storing data.

Each physical storage unit may be assigned a respective physical address ranging from zero (0) to N. Data is stored sequentially at an append point 820. The append point 820 moves sequentially through the physical storage space 800. After storing data at the append point 820, the append point advances sequentially 821 to the next available physical storage unit. Storage resources may be recovered by a groomer (or other process) anywhere along the length of the event log, for example at a tail at the "opposite end" of the ordered sequence of storage operations.

As used herein, an available physical storage unit refers to a physical storage unit that has been initialized and is ready to store data (e.g., has been erased). Some non-volatile storage media, such as non-volatile storage media 410, can only be reliably programmed once after erasure. Accordingly, as used herein, an available physical storage unit may refer to a storage unit that is in an initialized (or erased) state. In one embodiment, a storage division comprises a plurality of storage units. If the next storage division in the sequence is unavailable (e.g., comprises valid data, has not been erased or initialized, is out of service, etc.), the append point 820 selects the next available physical storage unit. In the FIG. 8A example, after storing data on the physical storage unit 816, the append point 820 may skip the unavailable storage division 813, and continue at the next available location (e.g., physical storage unit 817 of storage division 818).

Figure 8B:
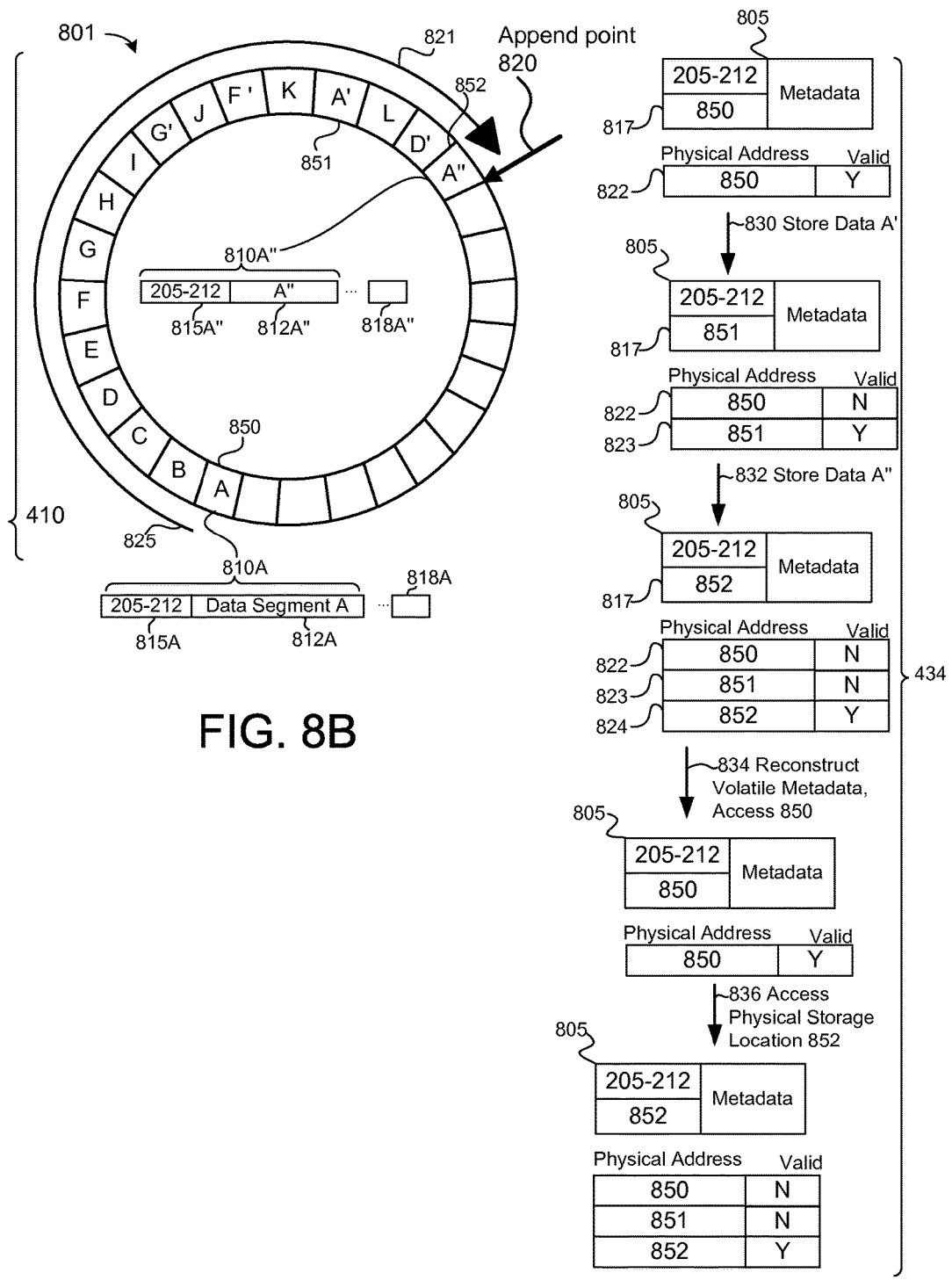
FIG. 8B depicts another example of a sequence of storage operations performed on a non-volatile storage media.

After storing data on the "last" storage unit (e.g., storage unit N 818 of storage division 815), the append point 820 wraps back to the first division 812 (or the next available storage division, if storage division 812 is unavailable). Accordingly, the append point 820 may treat the physical address space 801 as a loop or cycle. As depicted in FIG. 8B, the append point 820 sequentially cycles through the storage units 801 of the non-volatile storage device (e.g., in the sequence 821).

As discussed above, storing data in a sequential, log-based format may comprise persisting metadata on the non-volatile storage device 402 that describes the data stored thereon. The persistent metadata may comprise the logical identifier associated with the data and/or provide sequence information pertaining to the sequential ordering of storage operations performed on the non-volatile storage device. Accordingly, the sequential, log-based data may represent an "event log" that tracks the sequence of storage operations performed on the non-volatile storage device 402.

FIG. 8B depicts an example of a sequential, log-based data format. In the FIG. 8B example, the letters A-L represent data stored on physical storage units of a non-volatile storage device. Data A is initially stored at physical storage unit 850. When the data A is persisted at location 850, the physical storage unit reference 817 of the corresponding forward index entry 805 is updated to reference the physical storage unit 850. In addition, a reverse index entry 822 may be updated to indicate that the physical storage unit 80 comprises valid data and/or to associate the physical storage unit 850 with logical identifiers 205-212 (not shown). (For clarity, other portions of the forward index and/or reverse index are omitted from FIG. 8B.) The data A may be stored on the physical storage unit 850 in a sequential, log-based format, as described above. Accordingly, data A may be stored in a packet format 810A comprising the data segment A 812A, which may be encrypted, compressed, and/or whitened as described above. The packet 810A may further comprise indications 815A of the logical identifiers 205-212 associated with data A (in a header or the like). As shown in FIG. 8B, the logical identifiers may be stored together with the data A in the packet format 810A. The data A may also be associated with a sequence identifier 818A, which determines a position of the data packet 810A in the ordered sequence of storage operations performed on the non-volatile storage media 410.

When the data A is modified and/or overwritten, the updated data may not be stored in the original physical storage unit 850. Instead, at 830, the updated data A' is stored sequentially (out-of-place) at storage unit 851 (at the current position of the append point 820). Although not shown in FIG. 8B, the data A' may be stored in a sequential, log-based format, as described above. The volatile metadata 434 may be updated accordingly. The forward index entry 805 is updated to associate the logical identifiers 205-212 with the physical storage unit 851 comprising A'. The entry 822 of the reverse index may be updated to mark physical storage unit 850 as invalid, and an entry 823 may be updated to indicate that the physical storage unit 851 comprises valid data. Marking the physical storage unit 850 as invalid may allow the storage unit 850 to be reclaimed in a grooming and/or garbage collection operation, as described above.

At 832, the data A' is further modified and/or overwritten with data A" (e.g., a client may overwrite and/or modify data at the logical identifiers 215-212). The updated data A" is stored at the current append point 820 (physical storage unit 852) on the non-volatile storage media 410. The volatile metadata 434 is updated, as described above: the forward index entry 805 is updated to associate the entry with the physical storage unit 852, and a reverse index entry 824 is updated to indicate that the physical storage address 852 comprises valid data (and that the physical address 851 comprises invalid data). The "obsolete" versions A and A' may be retained on the non-volatile storage device until the corresponding physical storage units 850 and/or 851 are reclaimed (e.g., erased) in a grooming and/or recovery operation. The Data A" may be stored in the sequential, log-based format 810A", comprising logical identifiers 815A", data A", and a sequence identifier 818A", as described above.

The volatile metadata 434 may be subject to loss due to inter alia invalid shutdown conditions. The volatile metadata 434 may be reconstructed from data stored in the sequential, log-based format on the non-volatile storage media 410, as described above. As described above, the volatile metadata 434 may be reconstructed by sequentially accessing the ordered sequence of storage operations on the non-volatile storage device (e.g., the data stored in the sequential log-based format, described above).

At step 834, the volatile metadata 434 is reconstructed, and the physical storage unit 850 is accessed. The sequential, log-based format 810A at physical storage unit 850 comprises an indication 815A that the data corresponds to logical identifiers 205-212. Accordingly, the entry 805 of the forward index may be reconstructed to indicate that data of logical identifiers 205-212 is stored at physical storage unit 850. In addition, the reverse index may be updated to indicate that storage unit 850 comprises valid data. The volatile metadata 434 may be updated in response to accessing other entries in the log (e.g., other physical storage units on the non-volatile storage media 410). The data A" may be identified as the current, up-to-date version of the data by comparing the position of the data packet 810A" to the position of the data at 850 and 851 in the ordered sequence of storage operations (e.g., comparing the sequence identifiers of the data packets 810A and 810A"). Accordingly, at 836, in response to accessing physical storage unit 852, the volatile metadata 434 is updated to associate logical identifiers 205-212 with data A" at physical storage unit 852, and to invalidate the data A and A' at physical storage units 850 and 851.

As illustrated in FIG. 8B, the volatile metadata 434, such as the forward index 500 and/or reverse index 600, may be reconstructed from a sequence of storage operations preserved in the event log on the non-volatile storage media 410. In some cases, however, loss of volatile metadata 434 may cause inconsistent results. As described above, the storage layer interface 436 may be configured to receive TRIM messages (which may comprise a TRIM directive) from clients 412. In response to a TRIM message, the storage layer 430 may "logically invalidate" the data specified therein. As described above, "logically invalidate," refers to invalidating data of one or more logical identifiers in the volatile metadata 434, which may include, but is not limited to: removing references to the logical identifiers in the forward index 500, invalidating the data in the reverse index 600 (e.g., marking storage units comprising the data may be marked as "invalid"), and so on. A TRIM message may not require that data of the specified logical identifiers be immediately removed from the non-volatile storage media 410. Rather the TRIM message may be a "hint" that the data need not be retained on the non-volatile storage media 410; the data may remain on the non-volatile storage media 410 until the storage division (e.g., erase block) upon which the data is stored is recovered in a subsequent grooming operation. As discussed above, data that has been logically invalidated may remain on the non-volatile storage media 410 until it is removed in subsequent grooming operation(s). If the volatile metadata 434 is lost before the data is removed from the non-volatile storage media 410, the TRIM message may not be properly completed or complied with (e.g., the data may be considered to be valid after the volatile metadata 434 is reconstructed).

By contrast, a TRIM directive may require that the data be made inaccessible despite losses to the volatile metadata 434. Accordingly, a TRIM directive may comprise storing an indicator of the TRIM operation on the non-volatile storage media 410 (e.g., storing a persistent note on the non-volatile storage media 410). Accordingly, the storage layer 430 may not acknowledge completion of a TRIM directive until data of the logical identifiers subject to the TRIM directive are guaranteed to be inaccessible to a subsequent access request (e.g., read request). In some embodiments, the storage layer 430 may not acknowledge a TRIM message or directive until a corresponding persistent note has been stored on the non-volatile storage media 410.

Figure 8C:
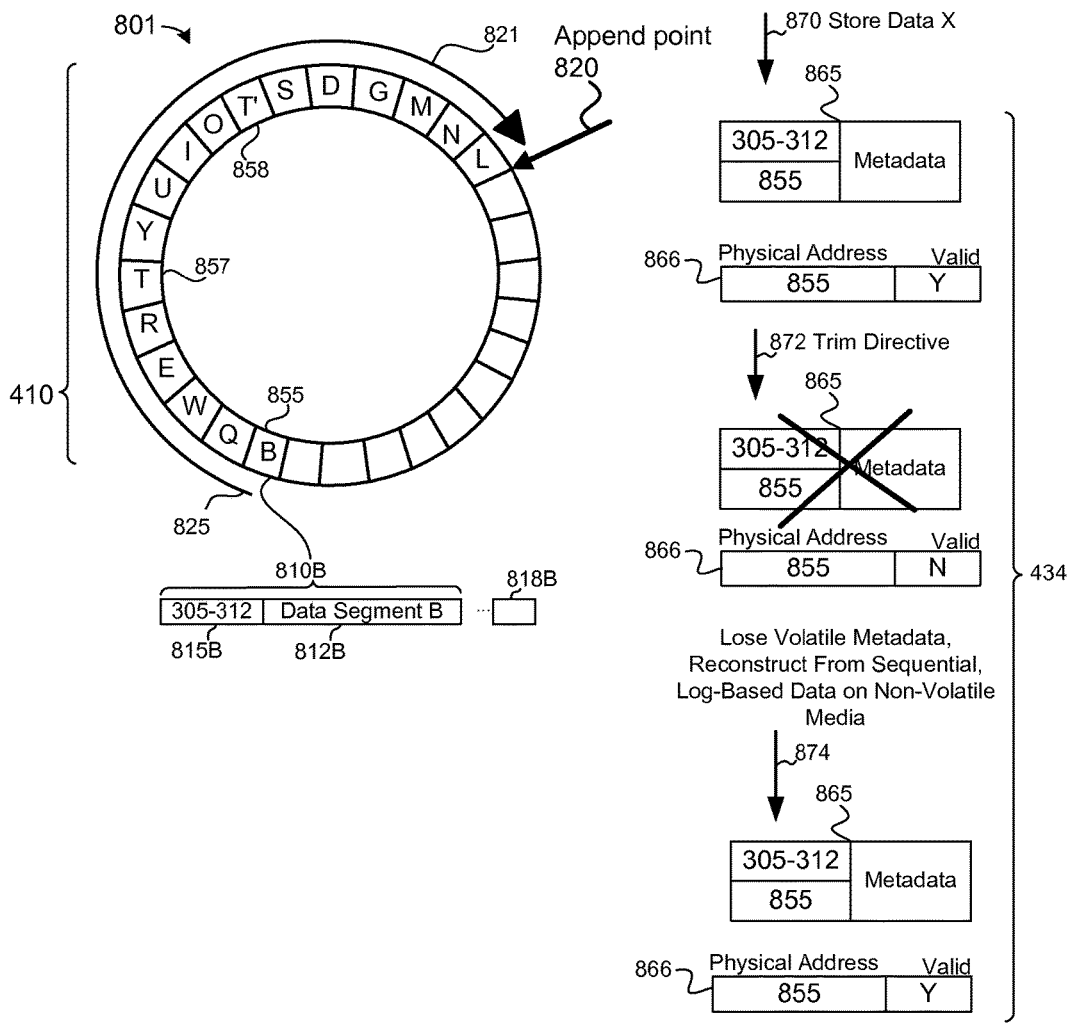
FIG. 8C depicts another example of a sequence of storage operations performed on a non-volatile storage media.

FIG. 8C depicts another example of a physical storage space 802 of a non-volatile storage media 410. At 870, data B of logical identifiers 305-312 is stored at physical storage unit 855 of the non-volatile storage media 410. The data B may be stored in a sequential, log-based format (packet format 710). Accordingly, the data B may be stored as a data segment 812 together with the logical identifier 815 (logical identifiers 305-312) of the data B. The data B may be stored in association with a sequence identifier 818, which indicates a position of the data B in the ordered sequence of storage operations performed on the non-volatile storage media 410.

Storing the data B may further comprise updating volatile metadata 434; an entry 865 of a forward index may be updated to associate the logical identifiers 305-312 with the physical storage unit 855, and an entry 866 in a validity bitmap (or reverse index) may be updated to indicate that the physical storage unit 855 comprises valid data.

At step 872, a TRIM message is received. As discussed above, in certain embodiments, the TRIM message may comprise a TRIM directive, which may require that data of one or more specified logical identifiers (e.g., logical identifiers 305-312) be made inaccessible and/or removed from the non-volatile storage media 410, as described above.

In response to the TRIM directive of step 872, data of the logical identifiers 305-312 may be "logically invalidated," which may comprise updating the volatile metadata 434 to remove the entry 865 that associates the logical identifiers 305-312 with the data B stored on physical storage unit 855. The logical invalidation may further comprise invalidating the physical storage unit 855 in a reverse index and/or validity bitmap entry 866.

Before the physical storage unit 855 is recovered (and the data B is removed from the non-volatile storage media 410), the volatile metadata 434 may be lost. The loss may occur due to an invalid shutdown, loss of power, software fault, or the like. The volatile metadata 434 may be reconstructed by sequentially reading data stored on the non-volatile storage media 410 in the sequential, log-based format, starting at a first predetermined physical location on the media and sequentially advancing through storage divisions, as described above. As the data is read, a logical identifier of the data may be determined (e.g., by examining a logical identifier indicator 815 stored with the data). Data that is "later" in the ordered sequence of storage operations for a given logical identifier over-writes previous versions of the data. For example, the data T at storage unit 857 may be "overwritten" by the data T' stored at storage unit 858 since T' is later in the ordered sequence of storage operations (e.g., closer to the append point 820 and/or is later as indicated by sequence identifiers of T and T').

The reconstruction, however, may fail to account for the TRIM of B, through a TRIM message for the logical identifier of data B. Since data B remains on the non-volatile storage media 410, data B may be included in the reconstructed non-volatile storage media. At step 874, and in response to reading the storage unit 855 comprising data B, entries 865 and/or 866 may be reconstructed. These entries 865 and 866 may indicate that B is valid data, which must be retained on the non-volatile storage media 410. Moreover, the data B may be readable by other clients (e.g., a request to access data of logical identifiers 305-312 may return data B). Accordingly, the effect of the TRIM message of 872 received prior to the loss of the volatile metadata 434 may be obviated.

In some embodiments, a TRIM message may be persisted on the non-volatile storage media, using a persistent note. This "persistent note" may be used to give effect to a TRIM message in the absence of volatile metadata 434 (e.g., even when the volatile metadata 434 is lost).

Figure 8D:
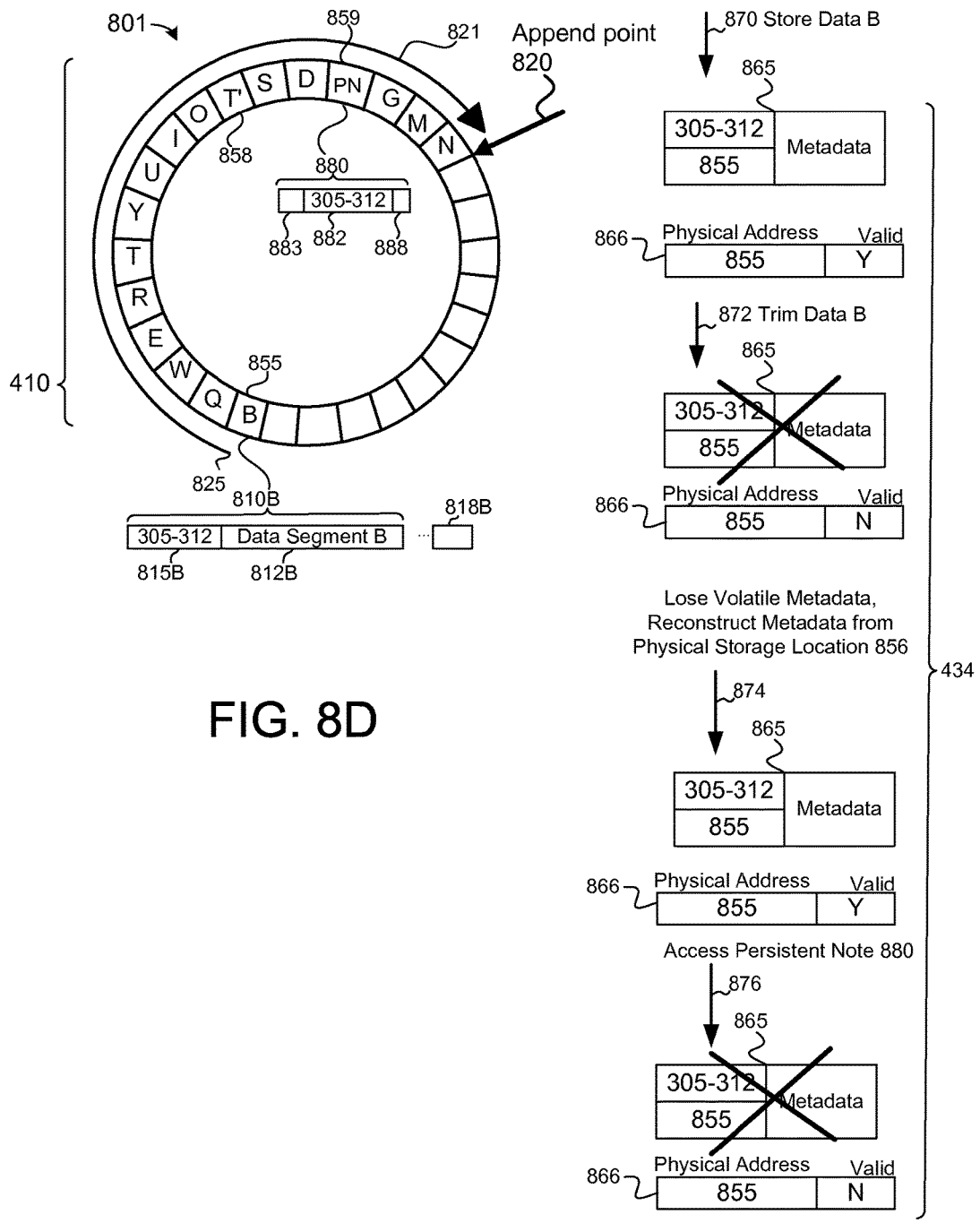
FIG. 8D depicts an example of a sequence of storage operations performed on a non-volatile storage media comprising a persistent note.

FIG. 8D depicts an exemplary persistent note 880 that may be used to implement a "persistent TRIM" message, hint, or directive. As discussed above, the volatile metadata 434 may be updated in response to the TRIM message at 872 (e.g., logically invalidated logical identifiers 305-312), which may comprise removing the entry 865 from a forward index and/or invalidating the data B in a reverse index entry 866. In addition, a persistent note 880 may be stored on the non-volatile storage media (e.g., at storage unit 859, as depicted in FIG. 8D). The persistent note 880 may specify the logical identifiers that are no longer in use to reference data on the non-volatile storage media 410 (e.g., logical identifiers 305-312). In some embodiments, the persistent note may comprise a header 883, which may be used to distinguish the persistent note 880 from other types of data on the non-volatile storage media 410 (e.g., data packets, such as data packet 810B comprising the B data 812B, logical identifier indicators 815B, and/or sequence identifier 818B). The persistent note 880 may also include an "original" sequence identifier 888, which may be used to order the persistent note 880 with respect to the ordered sequence of storage operations performed on the non-volatile storage media 410. The original sequence identifier 888 may be used to determine how long to retain the persistent note 880 on the non-volatile storage media 410. Accordingly, the persistent note 880 may retain the original sequence identifier 888 if/when the persistent note 880 is moved to a different physical storage unit on the non-volatile storage media 410 (e.g., in a grooming operation).

At step 874, the volatile metadata 434 is lost before data B is removed from the non-volatile storage media 410, as described above. During reconstruction of the volatile metadata 434, the storage unit 855 comprising data B is accessed and the volatile metadata 434 is updated to include an entry 865 associating logical identifiers 305-312 with physical storage unit 855, as described above. At step 876, the storage unit 859 comprising the persistent note 880 is accessed. The persistent note 880 indicates that the logical identifiers 305-312 are no longer in use to reference data on the non-volatile storage media 410 (e.g., the data B may be erased from the non-volatile storage media 410). In response to the persistent note 880, the volatile metadata 434 is updated to remove the entry 865 and/or to invalidate B (e.g., invalidate the data at physical storage unit 855). Accordingly, the persistent note 880 may be used to exclude the logical identifiers 882 from the volatile metadata 434, and preserve the effect of the TRIM message received at step 872. Although the logical identifiers of 882 comprise a contiguous range, the disclosure is not limited in this regard; a persistent note 880 could reference any set of contiguous and/or discontiguous logical identifiers in the logical address space 432.

Referring back to FIG. 4, the system 400 may comprise a cache layer 440 that is configured to cache data of a backing store 460 using the non-volatile storage device 402. The backing store 460 may comprise one or more hard disks, network attached storage (NAS), a storage area network (SAN), or other persistent store. The backing store 460 may comprise a plurality of physical storage units 461 capable of storing data of the storage clients 412. The backing store 460 may be communicatively coupled to the communication link 421. Alternatively, or in addition, the backing store 460 may be communicatively coupled to the host 401 (and storage layer 430) via a network 420.

The cache layer 440 may leverage the storage layer 430 to cache data of the backing store 460 on the non-volatile storage media 410. In some embodiments, the storage layer 430 is configured to provide a logical address space 432 corresponding to an address space of the backing store 460. The logical address space 432 may, therefore, correspond to the physical storage units 461 of the backing store 460. As discussed above, the storage layer 430 may maintain volatile, storage metadata 434 to associate logical identifiers of the backing store 460 with storage units of cache data on the non-volatile storage media 410 (e.g., physical storage units on the non-volatile storage device 402), which may include a forward index 500 and/or reverse index 600. The logical address space 432 may have a logical capacity that is equivalent to a physical storage capacity of the backing store 460. Alternatively, the logical address space 432 may exceed the physical storage capacity of the backing store 460. The logical capacity of the logical address space 432 (as well as the physical capacity of the backing store 460) may exceed the physical storage capacity of the non-volatile storage device 402. The storage layer 430 may manage allocations of the logical address space 432 and the physical storage capacity of the non-volatile storage media 402, as described above. In some embodiments, the storage layer 430 may provide a plurality of logical address spaces 432, each corresponding to a different backing store 460 and/or different client 412. The storage layer 430 may maintain separate volatile, storage metadata 434 for each logical address space 432.

The cache layer 440 may leverage the logical address space 432 and volatile, storage metadata 434 maintained by the storage layer 430 to cache data of the backing store 460. The cache layer 440 may reference cache data on the non-volatile storage media 410 using logical identifiers of the backing store 460 (through the logical address space 432 of the storage layer 430). Accordingly, the cache layer 440 may not have to maintain its own storage metadata; the cache layer may not maintain a separate index to associate logical identifiers of the backing store 460 with cache storage units on the non-volatile storage media 410. By leveraging the logical address space 432 and volatile, storage metadata 434 of the storage layer 430, the overhead of the cache layer 440 may be significantly reduced.

The cache layer 440 may comprise a cache controller 441 that is configured to coordinate the exchange of data between storage clients 412, backing store 460, and the non-volatile storage device 402. The cache controller 441 may manage cache admission, eviction, and the like. The cache controller 441 may implement a cache eviction policy based, inter alia, on cache metadata 442, such as cache access patterns (e.g., access frequency, whether the data is "hot," "warm," or "cold," and so on). The cache eviction policy may depend upon a last access time (e.g., least recently used), access frequency, ration of cache entry size to access time, or the like. The cache metadata 411 may comprise discardability indicators to identify cache data that can be evicted or removed from the non-volatile storage media 410. Discardable data may be cache data that has been copied (e.g., de-staged) to the backing store 460 and no longer needs to be stored on the cache.

Although the cache layer 440 is depicted as a separate component (separate from the storage layer 430), the disclosure is not limited in this regard. In some embodiments, the cache layer 440 may be implemented by and/or within the storage layer 430. Similarly, in some embodiments, the storage layer 430 and the cache layer 440 may share a common set of metadata (e.g., the metadata 434 may be combined with the cache metadata 442). For example, the cache layer 440 may leverage the forward index 500 of the metadata 434 to maintain information regarding data access, eviction candidates, discardability, and so on.

Figure 8E:
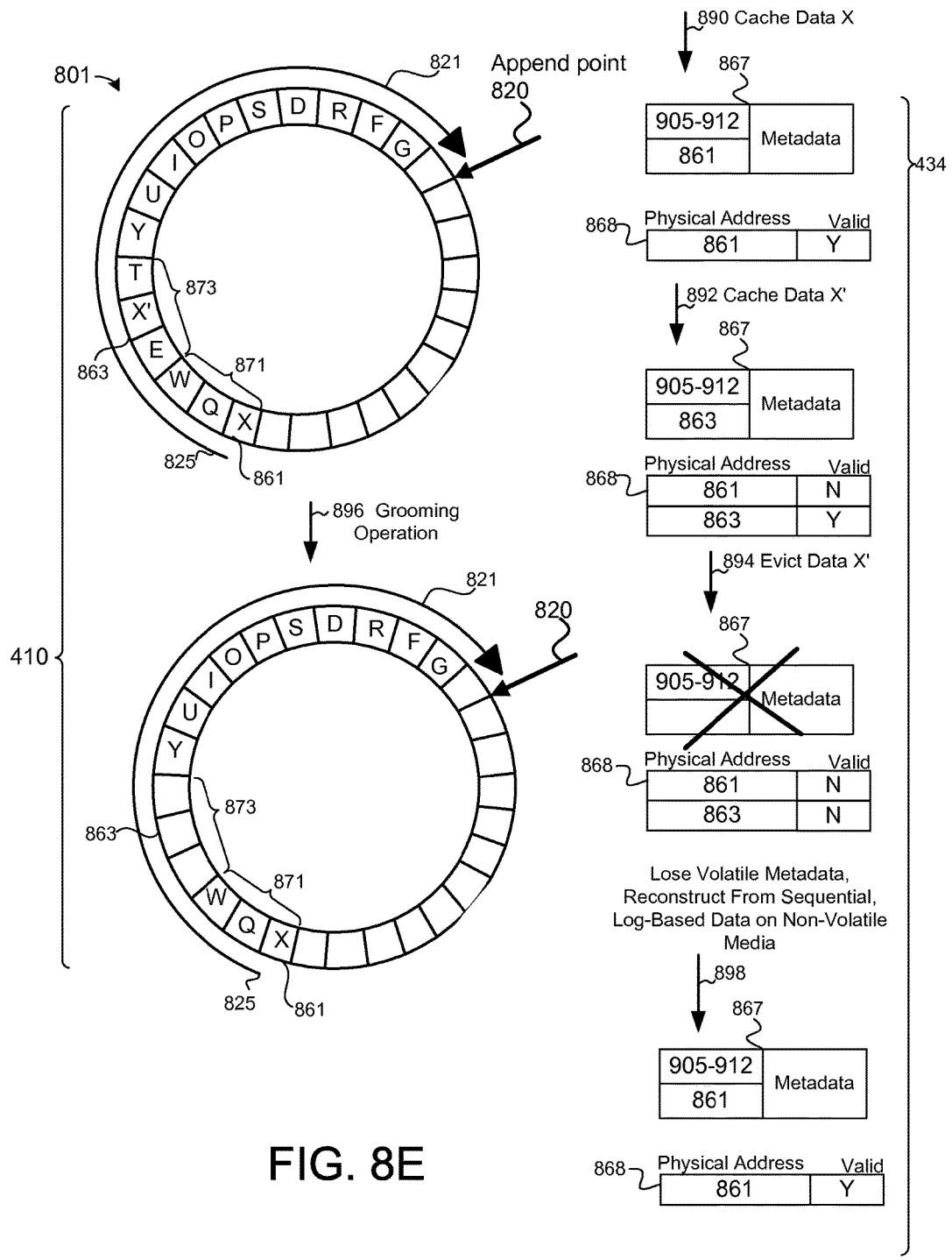
FIG. 8E depicts an example of an ordered sequence of cache storage operations performed on a non-volatile storage media.

Persistent notes may be used to maintain cache consistency despite losses of the volatile metadata 434 and/or 442. In the FIG. 8E example, the non-volatile storage device 402 may be used to cache data of the backing store 460. At step 890, data X may be admitted into the cache (by the cache management module 441). Admitting data X into the cache may comprise storing data X on the non-volatile storage media 410 in association with one or more logical identifiers of the backing store 460 (e.g., logical identifiers 905-912). The data X may be stored on the storage unit 861 within the storage division 871.

In response to admitting data X into the cache, the storage layer 430 and/or cache layer 440 may update the volatile metadata 434 and/or 442, as described above. An entry 867 in the forward index associates the logical identifiers 905-912 with the physical storage unit 861, and an entry 868 may be made in a reverse index (or bit in a validity bitmap) to indicate that the physical storage unit 860 comprises valid data.

At step 892, a client 412 may modify or replace data X with X'. In response, a new copy of X' is cached at storage unit 863 within storage division 873, the forward index metadata 867 is updated to associate the logical identifiers 905-912 with the new storage unit 863, and the reverse index metadata 868 is updated to indicate that the data of storage unit 861 is invalid and that the data of storage unit 863 is valid.

At step 894, the cache layer 440 and/or cache manager 441 may de-stage data X' to the backing store 460 and evict the data X' from the cache. If data X' has already been stored on the backing store 460 (e.g., in a write-through cache configuration) no de-staging may be needed. The eviction may operate similarly to a TRIM message and/or directive. The eviction may be implemented by way of a TRIM hint or a TRIM directive. The eviction may comprise logically invalidating the logical identifiers 905-912, which may comprise removing the entry 867 from the forward index and invalidating entry 868 in the reverse index (and/or validity bitmap).

At step 896, a storage recovery and/or grooming operation may erase the data of storage division 873 (and storage unit 863 which includes the data X') from the non-volatile storage media 410. The physical storage unit 861, however, may be stored within a different storage division 871 and, as such, may remain on the non-volatile storage media 410.

At step 898, the volatile metadata is lost and is reconstructed from the sequential, log-based data on the non-volatile storage media 410, as described above. In response to accessing storage unit 861, the entries 867 and 868 are reconstructed. Since X' is not on the non-volatile storage media 410, the obsolete version of X is deemed to be the up-to-date version of the data, resulting in an inconsistency between the cache and the backing store 460, because data X has been destaged to the backing store 460.

Figure 8F:
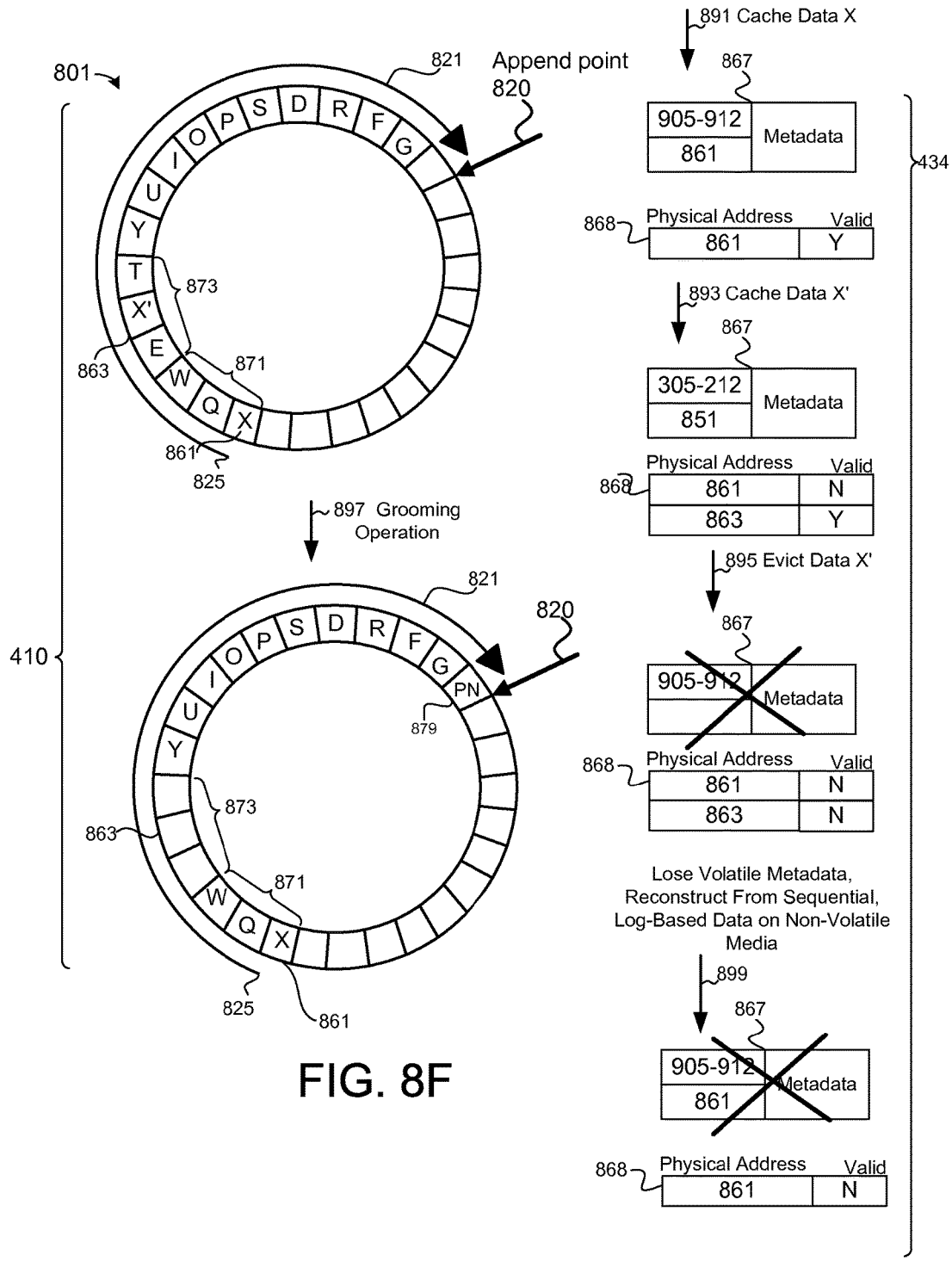
FIG. 8F depicts an example of an ordered sequence of cache storage operations performed on a non-volatile storage media comprising a persistent note.

FIG. 8F illustrates one embodiment of a persistent note 879 used to maintain cache consistency. At step 891, data X is admitted into the cache, as described above. At step 893, a client 412 modifies and/or overwrites data X with X', which is stored at storage unit 863 within storage division 873. The entries 867 and 868 of the volatile metadata 434 are updated accordingly. At step 895, the data X' is destaged and evicted from the cache. At step 895, the storage layer 430 and/or cache layer 440 may be configured to store a persistent note 879, identifying the logical identifier(s) of the evicted data (e.g., logical identifiers 905-912). In some embodiments, a persistent note may be stored in response to determining that an obsolete version of the evicted data (e.g., data X') remains on the non-volatile storage media 410 (e.g., by scanning the volatile metadata 434 and/or the non-volatile storage media 410 itself). Alternatively, a persistent note may be stored in response to all cache eviction operations.

At step 897, a grooming operation removes data X' from the non-volatile storage media 410, as described above. In some embodiments, the persistent note 879 may be stored in response to the grooming operation (as opposed to storing the persistent note 879 when the data X' is evicted from the cache). The obsolete version of data X at storage unit 861 remains on the non-volatile storage media 410, as described above.

At step 899, the volatile metadata 434 is lost and is reconstructed. During reconstruction, the entries 867 and 868 are created in response to accessing storage unit 861. In response accessing the persistent note, the logical identifiers of the obsolete version of data X may be excluded from the volatile metadata 434, which, as discussed above, may comprise removing the entry 867 corresponding to the data from forward index and/or marking the data as invalid a reverse index entry 868.

In some embodiments, each time a storage division is recovered, the persistent notes thereof (if any) are evaluated to determine whether the persistent note should remain on the non-volatile storage media 410. Persistent notes remain on the non-volatile storage media 410 until the data referenced thereby is removed or updated. Referring back to FIG. 8D, the persistent note 880 may be removed once data B (at storage unit 855) is removed from the non-volatile storage media (e.g., removal of data D will be indicated by the reverse index, forward index or the like).

Alternatively, or in addition, the persistent note 880 may be removed once data B has been overwritten and/or modified subsequent to receiving the TRIM message at step 872 (e.g., following the TRIM of data B at step 872 in the ordered sequence of storage operations on the non-volatile storage media 410). For example, after the TRIM of data B at step 872, a client 412 may store new, updated data in association with the logical identifiers 305-312. This new data will be stored at the append point and will "overwrite" the data B associated with the logical identifiers 305-312 (due to being more recent (data B is at the head of the event log) in the ordered sequence of storage operations on the non-volatile storage media 410) and, as such, the persistent note 880 is no longer needed.

In another example, a persistent note may be removed when the persistent note has a position in the ordered sequence earlier in log event "time"/"sequence" than a tail 825 of the ordered sequence of storage operations. In some embodiments, a groomer is configured to recover storage resources at the "tail" portion 825 of the sequence of ordered storage operations. When the tail portion 825 of the log "wraps" around and moves past the persistent note 880, any data referenced thereby will have been removed from the non-volatile storage media 410. Therefore, the persistent note 880 may be removed in response to determining that the persistent note 880 has a position in the ordered sequence of storage operations on the non-volatile storage media 410 that is later in the sequence than the position of the tail 825. In some embodiments, the groomer may be configured to recover storage resources anywhere within the log (e.g., not just at the tail 825). In this case, persistent notes may be removed when a sequence identifier of recovered data exceeds a sequence identifier of a persistent note by a pre-determined threshold.

As discussed above, the persistent note 880 may comprise an indication 888 of its original "log-time" (e.g., original order within the ordered sequence of storage operations performed on the non-volatile storage media 410). When a persistent note 880 is moved to a new storage division in a grooming operation, the persistent note 880 may retain its original log-time (e.g., original sequence identifier), to allow the persistent note 880 to be removed from the non-volatile storage media 410, as described above. The original log-time of the persistent note may be used to determine a position of the persistent note within the ordered sequence of storage operations (despite being stored at another storage division having a later sequence position in the log). Accordingly, the original log-time is used to maintain the position of the persistent note despite changes to the storage location of the persistent note.

In some embodiments, the storage layer 430 may maintain metadata pertaining to persistent notes on the non-volatile storage media 410 (e.g., in volatile metadata 434). The metadata may facilitate persistent note management and/or allow the storage layer 430 to efficiently determine whether a persistent note should be retained. The persistent note metadata may include an invalidation list, comprising information pertaining to logical identifiers (and/or physical storage units) of data affected by a persistent note and/or a FIFO datastructure comprising the log-time of one or more persistent notes on the non-volatile storage media. When the data invalidated by a persistent note is removed from the invalidation list due to inter alia grooming operation and/or overwrite, the corresponding persistent note may be removed from the FIFO. The persistent note may be flagged for removal (e.g., marked as invalid in a reverse map and/or validity bitmap), in response to removal from the FIFO.

In some embodiments, one or more persistent notes may be consolidated into a single, composite persistent note. For example, in response to a storage division (e.g., erase block) and/or logical storage division being recovered in a grooming operation, a plurality of persistent notes that are to be retained on the non-volatile storage media 410 may be identified. The persistent notes may be small in comparison to a minimum data storage size on the non-volatile storage media 410 (e.g., a minimum packet size). Accordingly, the plurality of persistent notes for a given storage division may be consolidated into a single "summary" persistent note that indicates that data of each of a plurality of different logical identifiers (e.g., different, noncontiguous ranges within the logical address space 432) no longer need to be retained on the non-volatile storage media 410. The summary persistent note may further comprise respective sequence identifying information to determine a position of each persistent note within the sequence of storage operations, as described above. The summary persistent note may be stored on the non-volatile storage media 410 and/or used to reconstruct the volatile metadata 434 as described herein.

In some embodiments, metadata pertaining to persistent notes (e.g., data subject to a TRIM message or directive) may comprise an "anti-index." During reconstruction of the volatile metadata 434, the anti-index may be constructed first (before reading other data). The anti-index may then be used to selectively exclude logical identifiers from the volatile metadata 434 (e.g., selectively ignore data invalidated by one or more persistent notes). In some embodiments, the anti-index is maintained in the volatile metadata 434 during normal operations (e.g., outside of the reconstruction context). The anti-index may be periodically persisted to the non-volatile storage media 410 (along with other portions of the volatile metadata 434), to prevent inconsistencies and/or to speed up reconstruction of the volatile metadata 434. Alternatively, or in addition, persistent notes may be appended to predetermined storage location(s) on the non-volatile storage media (e.g., using a different append point than the append point 820). The dedicated persistent note storage area may allow the anti-index described above to be reconstructed more quickly; the anti-index may be reconstructed by accessing the predetermined, persistent note storage location as opposed to accessing the non-volatile storage media 410 as a whole.

Figure 9:
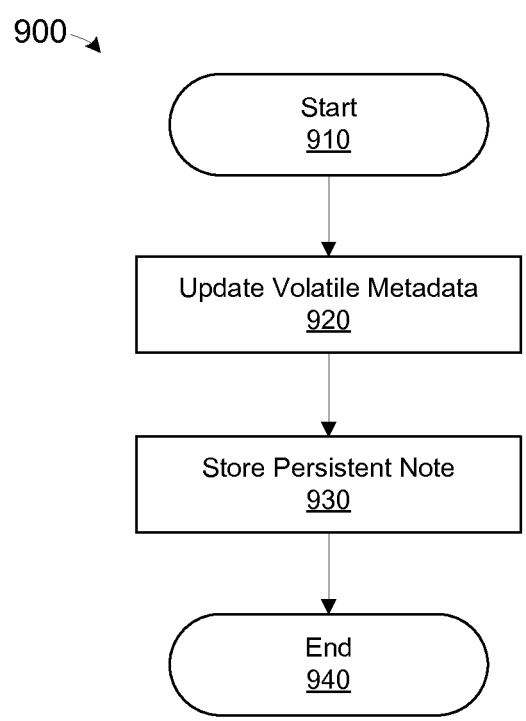
FIG. 9 is a flow diagram of one embodiment of a method for managing a non-volatile storage media.
Figure 10:
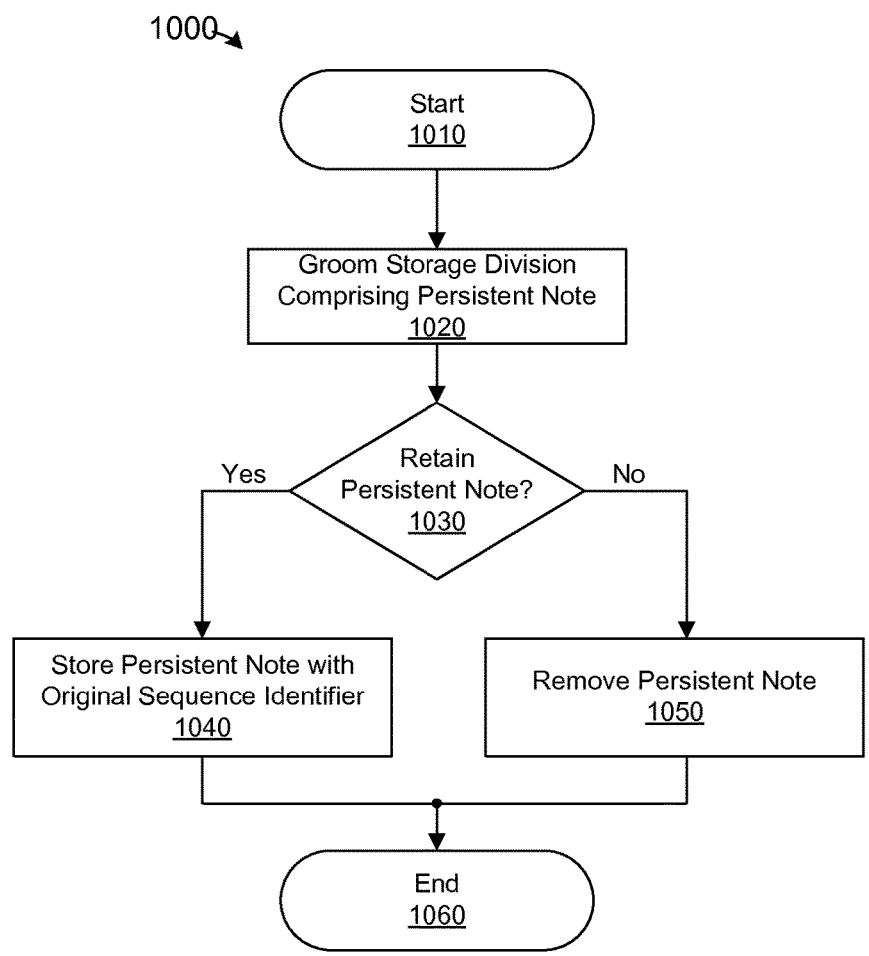
FIG. 10 is a flow diagram of one embodiment of a method for managing persistent notes on a non-volatile storage media.

FIG. 9 is a flow diagram of one embodiment of a method for managing storage operations on a non-volatile storage media. At step 910, the method 900 starts and is initialized. Step 910 may comprise initializing and/or allocating resources to manage the non-volatile storage device 402, which may include, but is not limited to: storage layers, such as the storage layer 430, communications interfaces (e.g., bus 421, network 420, and so on), allocating volatile memory, and so on. Step 910 may further comprise presenting a logical address space 432, storing data of logical identifiers on the non-volatile storage media, and maintaining volatile metadata 434 comprising associations between logical identifiers and respective physical storage units.

Step 920 comprises updating the volatile metadata to indicate that a logical identifier is no longer in use to reference data on the non-volatile storage device. The update may occur in response to a TRIM message, a TRIM directive, a cache eviction, or the like, as described above.

Step 930 comprises storing a persistent note on the non-volatile storage media to indicate that data of the logical identifier does not need to be retained on the non-volatile storage media. Step 930 may further comprise logically invalidating the logical identifier in the volatile metadata, which may include removing the logical identifier from a forward index and/or invalidating the data in a reverse index.

In some embodiments, step 930 comprises acknowledging a TRIM directive (or other message). The TRIM directive may be acknowledged in response to storing the persistent note on the non-volatile storage media. The method 900 ends at step 940.

FIG. 1000 is a flow diagram of one embodiment of a method 1000 for managing persistent notes on a non-volatile storage media. Step 1010 comprises starting and/or initializing the method 1000 as described above. Step 1020 may comprise grooming a storage division of the non-volatile storage media 410 that comprises a persistent note.

Step 1030 comprises determining whether the persistent note needs to be retained on the non-volatile storage media. As discussed above, data may be stored on the non-volatile storage media in a sequential, log-based format, which defines an ordered sequence of storage operations performed on the non-volatile storage media. In some embodiments, the persistent note may be retained when data referenced by the persistent note remains on the non-volatile storage media (e.g., as indicated by the reverse index and/or other metadata, such as the persistent trim metadata, described above). Alternatively, or in addition, a persistent note may be removed in response to determining that data referenced by the persistent note has been overwritten in one or more storage operations that occurred after the persistent note in the ordered sequence of storage operations. Step 1030 may further comprise comparing a position of the persistent note in the ordered sequence of storage operations to a position of the tail 855 (e.g., the position of the groomer). The persistent note may be removed in response to determining that the position of the persistent note is earlier than the position of the tail 855.

In response to determining that the persistent note is to be retained, the persistent note is copied to a new storage division (physical storage unit) at step 1040. Step 1040 may comprise storing an original position of the persistent note in the ordered sequence of storage operations (e.g., the original sequence identifier of the persistent note). In some embodiments, step 1040 comprises consolidating two or more persistent notes into a summary persistent note, as described above. The summary persistent note may identify two or more logical identifiers (e.g., a plurality of contiguous or discontiguous ranges within the logical address space 432) that are no longer in use to reference data on the non-volatile storage media. The summary persistent note may retain the original sequence information of each constituent persistent note, such that a position of each persistent note within the sequence of storage operations can be determined. The summary persistent note may be stored on the non-volatile storage media 410 and/or used to reconstruct the volatile metadata 434 as described above.

In response to determining that the persistent note does not need to be retained, the persistent note may be removed from the non-volatile storage media at step 1050. The method 1000 ends at step 1060.

Figure 11:
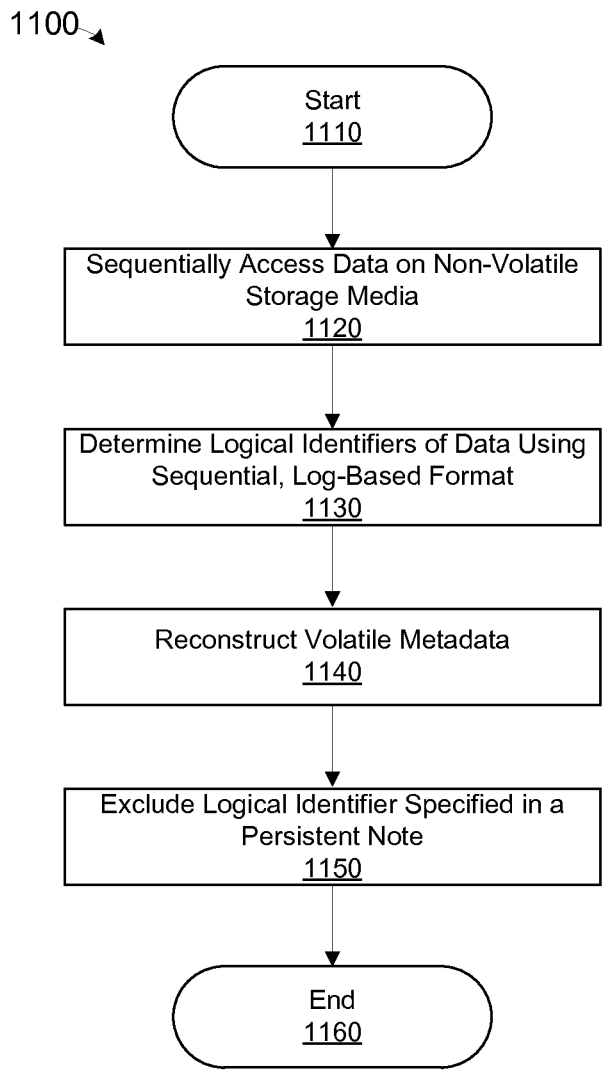
FIG. 11 is a flow diagram of one embodiment of a method for reconstructing volatile metadata.

FIG. 11 is a flow diagram of one embodiment of a method for reconstructing volatile metadata from data stored in a sequential, log-based format. Step 1110 comprising starting and initializing the method 1100 as described above.

Step 1120 comprises accessing data on a non-volatile storage media 410. The data may be accessed sequentially from a tail 825 to an append point 820 (e.g., according to the sequential access pattern 821, described above). The data may be stored in the sequential, log-based format described above. Step 1130 comprises determining a logical identifier of data accessed at step 1120 using the sequential, log-based format of the data. As described above, data may be stored together with a logical identifier thereof (e.g., in a header of a data packet 710). Step 1130 may comprise accessing the packet format of the data, and extracting the logical identifier of the data therefrom.

Step 1140 comprises reconstructing volatile metadata 434 using the logical identifier(s) and/or physical storage unit locations determined at step 1120. The volatile metadata 434 may comprise a forward index of associations between logical identifiers of a logical address space 432 and physical storage units. The metadata 434 may further comprise a reverse index comprising indications of physical storage units that comprise valid and/or invalid data.

Step 1150 may comprise accessing a persistent note that references a specified logical identifier. Step 1150 may comprise excluding the specified logical identifier from the volatile metadata 1140, which may comprise logically invalidating the specified logical identifier (e.g., removing the logical identifier from a forward index and/or invalidating data of the logical identifier in a reverse index), as described above. In some embodiments, step 1150 may comprise constructing and/or accessing an anti-index identifying logical identifiers that are no longer in use to reference data on the non-volatile storage media 410, as described above. Accordingly, step 1150 may comprise scanning the non-volatile storage media 410 (and/or scanning a pre-determined portion of the non-volatile storage media 410) to access persistent notes thereon (and construct the anti-index). Accordingly, step 1150 may comprise skipping data corresponding to logical identifier(s) identified within the anti-index.

Alternatively, step 1150 may comprise adding references to logical identifiers as data in accessed at step 1140, and removing references to the data (e.g., logically invalidating the data), in response to accessing a persistent note at step 1150. The method 1100 ends at step 1160.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the disclosure.

We claim:

1. A method for managing storage operations on a non-volatile storage medium, the method comprising:
   a storage client issuing a message to a storage layer, the message specifying a logical identifier that is no longer in use by the storage client to reference data stored on the non-volatile storage medium;
   responsive to receiving the message from the storage client, the storage layer storing a persistent note, wherein the persistent note comprises the specified logical identifier and indicates that the specified logical identifier does not correspond to valid data stored on the non-volatile storage medium;
   the storage layer providing an interface configured to indicate whether identified logical identifiers correspond to valid data stored on the non-volatile storage medium, wherein the interface is independent of a read interface for accessing data corresponding to the identified logical identifiers stored on the non-volatile storage medium; and
   responsive to receiving a request from the storage client, the storage layer determining whether a logical identifier corresponds to valid data stored on the non-volatile storage medium based on whether an entry corresponding to the logical identifier exists in an index maintained by the storage layer and comprising entries corresponding to assignments between logical identifiers and physical storage locations of the non-volatile storage medium;
   wherein at least one of the storage layer and the storage client is embodied as non-transitory instructions stored on a non-volatile storage medium.

2. The method of claim 1, further comprising the storage layer returning, to the storage client, an indication that a particular logical identifier does not correspond to valid data 3tored on the non-volatile storage medium in response to determining that the particular logical identifier is not in the index.

3. The method of claim 2, wherein the indication that the particular logical identifier does not correspond to valid data stored on the non-volatile storage medium is returned while data corresponding to the particular logical identifier is stored on the non-volatile storage medium.

4. The method of claim 1, further comprising the storage layer reconstructing assignments between logical identifiers and storage locations of the non-volatile storage medium by use of metadata stored on the non-volatile storage medium, wherein reconstructing the assignments further comprises invalidating an assignment between a particular logical identifier and a storage location in response to identifying a persistent note stored on the non-volatile storage medium pertaining to one or more of the particular logical identifier and the storage location.

5. The method of claim 4, wherein data is stored on the non-volatile storage medium in a packet format, the packet format comprising a data segment and a header that identifies a logical identifier of the data segment.

6. The method of claim 4, wherein the identified persistent note comprises a physical address.

7. The method of claim 1, further comprising the storage layer returning, to the storage client, an indication that a particular logical identifier corresponds to valid data stored on the non-volatile storage medium in response to determining that the particular logical identifier exists in the index.

8. The method of claim 1, wherein the index comprises entries configured to map logical identifiers of the logical address space to storage units of the non-volatile storage medium, the method further comprising the storage layer removing an entry from the index in response to a message comprising a logical identifier that is no longer in use to reference data stored on the non-volatile storage medium.

9. A storage system comprising:
   a non-volatile storage device;
   a storage client configured to issue an invalidation directive, the invalidation directive designating a logical identifier that is no longer in use by the storage client to reference data stored on the non-volatile storage device;
   a storage layer configured to maintain a forward map comprising assignments between logical identifiers of a logical address space and respective storage units of the non-volatile storage device, the respective storage units of the non-volatile storage device comprising data assigned to the logical identifiers;
   wherein the storage layer is configured such that, responsive to receiving the invalidation directive from the storage client, the storage layer writes persistent metadata on the non-volatile storage device, wherein the persistent metadata comprises the designated logical identifier and indicates that the designated logical identifier does not correspond to valid data stored on the non-volatile storage device; and
   wherein the storage layer is configured to return an indication that the designated logical identifier does not correspond to data stored on the non-volatile storage device in response to a query pertaining to the designated logical identifier and while data corresponding to the designated logical identifier remains on the non-volatile storage device, the query being independent of a read command;
   wherein at least one of the storage layer and the storage client is embodied as non-transitory instructions stored on a non-volatile storage medium.

10. The storage system of claim 9, further comprising a reconstruction module configured to reconstruct the forward map by use of data stored on the non-volatile storage device, wherein the reconstruction module is configured to determine that a storage unit comprising data assigned to the designated logical identifier comprises invalid data by use of the persistent metadata stored on the non-volatile storage device.

11. The storage system of claim 9, wherein, in response to the invalidation directive, the storage layer is configured to remove an assignment between the designated logical identifier and a storage unit comprising data assigned to the designated logical identifier from the forward map while the data assigned to the designated logical identifier remains on the storage unit.

12. The storage system of claim 11, wherein the storage layer is configured to return an indication that a particular logical identifier corresponds to valid data stored on the non-volatile storage device in response to determining that the particular logical identifier exists in the forward map.

13. The storage system of claim 11, wherein the storage layer is configured to identify logical identifiers that exist in the forward map in response to requests pertaining to the logical identifiers.

14. The storage system of claim 9, wherein the storage layer is further configured to mark a storage unit comprising data assigned to the designated logical identifier as invalid in a validity bitmap, wherein a groomer is configured to recover a storage division comprising the storage unit by relocating valid data stored on the storage division, and erasing the storage division, and wherein the groomer is configured to determine that the storage unit corresponding to the designated logical identifier does not comprise valid data by use of the validity bitmap.

15. A non-transitory computer-readable storage medium comprising program code configured for execution by a computing device to cause the computing device to perform operations, comprising:
mapping identifiers of a logical address space to respective storage addresses of a non-volatile storage device in response to storing data segments corresponding to the identifiers at the respective storage addresses;
in response to a discard request comprising a particular identifier of the logical address space;
invalidating a mapping between the particular identifier and the respective storage address of the non-volatile storage device, and
storing invalidation metadata on the non-volatile storage device, wherein the invalidation metadata comprises the particular logical identifier and is configured to indicate that the particular logical identifier does not correspond to valid data stored on the non-volatile storage device; and
indicating whether specified identifiers of the logical address space correspond to valid data stored on the non-volatile storage device in response to queries pertaining to the specified identifiers based on whether mappings exist between the specified identifiers and respective storage addresses of the non-volatile storage device, the queries being independent of a read command.

16. The non-transitory computer-readable storage medium of claim 15, the operations further comprising responding to a query pertaining to the particular identifier with an indication that the particular identifier does not correspond to valid data stored on the non-volatile storage device while a data segment corresponding to the particular identifier remains on the non-volatile storage device.

17. The non-transitory computer-readable storage medium of claim 15, the operations further comprising:
storing the data segments with persistent metadata on the non-volatile storage device, the persistent metadata configured to indicate identifiers of the logical address space associated with the respective data segments; and
reconstructing mappings between identifiers of the logical address space and respective storage addresses of the data segments by use of the persistent metadata stored on the non-volatile storage device.

18. The non-transitory computer-readable storage medium of claim 17, wherein reconstructing the mappings between the identifiers of the logical address space and the respective storage addresses of the data segments comprises one or more of:
invalidating a mapping between an identifier and a data segment stored on the non-volatile storage device in response to invalidation metadata comprising the identifier; and
omitting a mapping between an identifier and a stored data segment based on invalidation metadata comprising the identifier.

19. The non-transitory computer-readable storage medium of claim 17, wherein reconstructing the mappings comprises accessing data segments stored on the non-volatile storage device according to a log order of the data segments stored on the non-volatile storage device.

* * * * *